(12) United States Patent
Billi-Duran et al.

(10) Patent No.: US 10,401,839 B2
(45) Date of Patent: Sep. 3, 2019

(54) WORKFLOW TRACKING AND IDENTIFICATION USING AN INDUSTRIAL MONITORING SYSTEM

(71) Applicant: Rockwell Automation Technologies, Inc., Mayfield Heights, OH (US)

(72) Inventors: Sharon M. Billi-Duran, Euclid, OH (US); Christopher W. Como, Chagrin Falls, OH (US); Edward A. Gray, Olmsted Township, OH (US); Kyle K. Reissner, Hudson, OH (US); Jonathan D. Walter, Broadview Heights, OH (US); Mohit Singhai, Beachwood, OH (US); Douglas J. Reichard, Fairview Park, OH (US); Scott N. Sandler, Chagrin Falls, OH (US); Ronald E. Bliss, Twinsburg, OH (US); Michael J. Pantaleano, Willoughby, OH (US); Ryan Cahalane, Chagrin Falls, OH (US); Jessica L. Korpela, Milwaukee, WI (US); Bruce T. McCleave, Jr., Mission Viejo, CA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 201 days.

(21) Appl. No.: 15/465,246

(22) Filed: Mar. 21, 2017

(65) Prior Publication Data

US 2018/0088564 A1    Mar. 29, 2018

Related U.S. Application Data

(60) Provisional application No. 62/399,998, filed on Sep. 26, 2016.

(51) Int. Cl.
*G05B 19/418*    (2006.01)

(52) U.S. Cl.
CPC .............. *G05B 19/41865* (2013.01); *G05B 2219/31449* (2013.01); *G05B 2219/31464* (2013.01); *Y02P 90/14* (2015.11); *Y02P 90/20* (2015.11)

(58) Field of Classification Search
CPC .... G05B 19/41865; G05B 2219/31449; G05B 2219/31464; Y02P 90/14; Y02P 90/20
See application file for complete search history.

(56) References Cited

U.S. PATENT DOCUMENTS

| 5,168,441 A | 12/1992 | Onarheim et al. |
| 5,471,214 A | 11/1995 | Faibish et al. |

(Continued)

FOREIGN PATENT DOCUMENTS

| CN | 103543700 B | 8/2016 |
| EP | 1 814 045 A2 | 8/2007 |

(Continued)

OTHER PUBLICATIONS

Extended European Search Report for EP Patent Application Serial No. 17150085.3-1802 dated May 10, 2017, 8 pages.

(Continued)

Primary Examiner — Thomas C Lee
Assistant Examiner — Anzuman Sharmin
(74) Attorney, Agent, or Firm — Amin, Turocy & Watson, LLP

(57) ABSTRACT

An industrial workflow tracking and identification system captures optimal employee workflows for addressing maintenance issues or operating industrial systems, and renders these workflows at appropriate times in order to guide operators and maintenance personnel through optimal sequences for carrying out operations or addressing maintenance issues. The system monitors and indexes both plant-wide system data as well as employee behaviors, and (Continued)

identifies correlations between operational outcomes and user workflows. In this way, the system tracks and captures optimal employee workflows for addressing particular maintenance issues, performing certain procedures, or achieving preferred production outcomes. By identifying and recording correlations between observed employee behaviors and production outcomes, the system creates a library of best practices that can be used as a training tool, as well as to provide substantially real-time guidance to maintenance staff and operators in connection with solving a problem or performing a task.

20 Claims, 17 Drawing Sheets

(56) References Cited

U.S. PATENT DOCUMENTS

| | | |
|---|---|---|
| 5,777,874 A | 7/1998 | Flood et al. |
| 6,002,406 A | 12/1999 | Zhao |
| 6,334,124 B1 | 12/2001 | Bouchard et al. |
| 6,583,794 B1 | 6/2003 | Wattenberg |
| 6,788,315 B1 | 9/2004 | Kekic et al. |
| 7,612,661 B1 | 11/2009 | Johnson et al. |
| 8,285,744 B2 | 10/2012 | Dorgelo et al. |
| 8,453,091 B1 | 5/2013 | Rao et al. |
| 8,489,641 B1 | 7/2013 | Seefeld et al. |
| 8,819,149 B2 | 8/2014 | Amidon et al. |
| 8,886,153 B2 | 11/2014 | Velusamy |
| 9,069,382 B1 | 6/2015 | Starner et al. |
| 9,213,714 B1 | 12/2015 | Ording |
| 9,237,141 B2 | 1/2016 | Logue et al. |
| 9,438,648 B2 | 9/2016 | Asenjo et al. |
| 9,709,978 B2 | 7/2017 | Asenjo et al. |
| 9,937,577 B2* | 4/2018 | Daniel ............... B23K 9/0956 |
| 9,952,882 B2 | 4/2018 | Kuscher et al. |
| 2002/0049775 A1 | 4/2002 | Friedrich et al. |
| 2002/0158873 A1 | 10/2002 | Williamson |
| 2004/0181549 A1 | 9/2004 | Pate |
| 2005/0010307 A1 | 1/2005 | Dove et al. |
| 2005/0023347 A1 | 2/2005 | Wetzel et al. |
| 2005/0188376 A1 | 8/2005 | Matsumoto et al. |
| 2005/0204315 A1 | 9/2005 | Knol et al. |
| 2006/0161544 A1 | 7/2006 | Lee et al. |
| 2006/0241792 A1 | 10/2006 | Pretlove et al. |
| 2006/0271884 A1 | 11/2006 | Hurst |
| 2007/0078824 A1 | 4/2007 | Dorgelo et al. |
| 2008/0007555 A1 | 1/2008 | Vrba et al. |
| 2008/0072180 A1 | 3/2008 | Chevalier et al. |
| 2009/0077055 A1 | 3/2009 | Dillon et al. |
| 2009/0085934 A1* | 4/2009 | Baier ............... G06Q 10/06 345/660 |
| 2009/0086021 A1 | 4/2009 | Baier et al. |
| 2009/0088875 A1 | 4/2009 | Baier et al. |
| 2009/0089225 A1 | 4/2009 | Baier et al. |
| 2009/0112816 A1 | 4/2009 | Marlow |
| 2009/0125796 A1 | 5/2009 | Day et al. |
| 2009/0216341 A1 | 8/2009 | Enkerud et al. |
| 2009/0307162 A1* | 12/2009 | Bui ............... G06N 5/022 706/12 |
| 2009/0307255 A1 | 12/2009 | Park |
| 2010/0016995 A1* | 1/2010 | Barat ............... G06F 16/217 700/32 |
| 2010/0082661 A1 | 4/2010 | Beaudreau |
| 2011/0022198 A1 | 1/2011 | Plache et al. |
| 2011/0119227 A1 | 3/2011 | Wang et al. |
| 2011/0093188 A1 | 4/2011 | Barkai et al. |
| 2011/0115816 A1 | 5/2011 | Brackney |
| 2011/0298579 A1 | 12/2011 | Hardegger et al. |
| 2011/0316884 A1 | 12/2011 | Giambalvo et al. |
| 2012/0120070 A1 | 5/2012 | Baillot |
| 2012/0233573 A1 | 9/2012 | Sullivan et al. |
| 2012/0242648 A1 | 9/2012 | Baier et al. |
| 2012/0249588 A1 | 10/2012 | Tison et al. |
| 2012/0249741 A1 | 10/2012 | Maciocci et al. |
| 2012/0254792 A1 | 10/2012 | Husoy et al. |
| 2012/0259436 A1 | 10/2012 | Resurreccion et al. |
| 2012/0300089 A1 | 11/2012 | Sbaiz et al. |
| 2012/0314571 A1 | 12/2012 | Forssell |
| 2013/0006395 A1 | 1/2013 | Plache et al. |
| 2013/0031508 A1 | 1/2013 | Kodosky et al. |
| 2013/0054573 A1 | 2/2013 | Snellman et al. |
| 2013/0073400 A1 | 3/2013 | Heath |
| 2013/0110978 A1 | 5/2013 | Gordon et al. |
| 2013/0120449 A1 | 5/2013 | Ihara et al. |
| 2013/0124253 A1 | 5/2013 | Cooper et al. |
| 2013/0124465 A1 | 5/2013 | Pingel et al. |
| 2013/0124613 A1 | 5/2013 | Plache et al. |
| 2013/0125233 A1 | 5/2013 | Bush et al. |
| 2013/0169681 A1 | 7/2013 | Rasane et al. |
| 2013/0211546 A1 | 8/2013 | Lawson et al. |
| 2013/0211559 A1 | 8/2013 | Lawson et al. |
| 2013/0222373 A1 | 8/2013 | Weinstein et al. |
| 2013/0246539 A1 | 9/2013 | Davis |
| 2013/0083012 A1 | 10/2013 | Han et al. |
| 2013/0257863 A1 | 10/2013 | Mikkelsen |
| 2013/0275908 A1 | 10/2013 | Reichard |
| 2013/0290899 A1 | 10/2013 | Amran |
| 2014/0032849 A1 | 1/2014 | De Vleeschauwer et al. |
| 2014/0047064 A1 | 2/2014 | Maturana et al. |
| 2014/0047106 A1 | 2/2014 | Leung et al. |
| 2014/0047107 A1 | 2/2014 | Maturana et al. |
| 2014/0143395 A1 | 5/2014 | Geltner et al. |
| 2014/0207870 A1 | 7/2014 | Vaya |
| 2014/0240356 A1 | 8/2014 | Cupitt et al. |
| 2014/0250377 A1 | 9/2014 | Bisca et al. |
| 2014/0253588 A1 | 9/2014 | Mandala |
| 2014/0258940 A1 | 9/2014 | Han et al. |
| 2014/0282215 A1 | 9/2014 | Grubbs et al. |
| 2014/0316540 A1 | 10/2014 | Loncar et al. |
| 2014/0335480 A1* | 11/2014 | Asenjo ............... G09B 19/18 434/107 |
| 2014/0336785 A1 | 11/2014 | Asenjo et al. |
| 2014/0358256 A1 | 12/2014 | Billi et al. |
| 2015/0077555 A1 | 3/2015 | Scalisi |
| 2015/0146007 A1 | 5/2015 | Dusik et al. |
| 2015/0213465 A1 | 7/2015 | Noyes et al. |
| 2015/0281329 A1 | 10/2015 | Dimov |
| 2015/0371455 A1 | 12/2015 | Abdel-Rahman et al. |
| 2016/0103750 A1 | 4/2016 | Cooper et al. |
| 2016/0127690 A1 | 5/2016 | Kaehler et al. |
| 2016/0132538 A1 | 5/2016 | Bliss et al. |
| 2016/0132595 A1 | 5/2016 | Bliss et al. |
| 2016/0176724 A1 | 6/2016 | Ji et al. |
| 2016/0217381 A1 | 7/2016 | Bloomquist et al. |
| 2016/0226731 A1 | 8/2016 | Maroulis |
| 2016/0267759 A1 | 9/2016 | Kerzner |
| 2016/0274553 A1 | 9/2016 | Strohmenger et al. |
| 2016/0292895 A1 | 10/2016 | Billi et al. |
| 2016/0322078 A1 | 11/2016 | Bose et al. |
| 2016/0337289 A1 | 11/2016 | Duca et al. |
| 2016/0337441 A1 | 11/2016 | Bloomquist et al. |
| 2016/0343163 A1 | 11/2016 | Venkatesha et al. |
| 2017/0032574 A1 | 2/2017 | Sugaya |
| 2017/0053445 A1 | 2/2017 | Chen et al. |
| 2017/0060379 A1 | 3/2017 | Capozella et al. |
| 2017/0091607 A1 | 3/2017 | Emeis et al. |
| 2017/0108838 A1 | 4/2017 | Todeschini et al. |
| 2017/0116259 A1 | 4/2017 | Elliot et al. |
| 2017/0195265 A1 | 7/2017 | Billi et al. |
| 2017/0210017 A1 | 7/2017 | Yamamoto et al. |
| 2017/0270362 A1 | 9/2017 | Barnehama et al. |
| 2017/0300753 A1 | 10/2017 | Billi et al. |
| 2017/0337352 A1 | 11/2017 | Williams |
| 2018/0054432 A1 | 2/2018 | Bailey et al. |

FOREIGN PATENT DOCUMENTS

| | | |
|---|---|---|
| EP | 1906289 | 4/2008 |
| EP | 2077473 | 7/2009 |
| EP | 2 380 709 A2 | 10/2011 |
| EP | 2592812 | 5/2013 |

(56) References Cited

FOREIGN PATENT DOCUMENTS

| EP | 2801935 | 11/2014 |
|---|---|---|
| EP | 2 927 854 A1 | 10/2015 |
| EP | 2 942 717 A1 | 11/2015 |
| EP | 2940544 | 11/2015 |
| EP | 3 018 597 A1 | 5/2016 |
| EP | 3 037 901 A2 | 6/2016 |
| EP | 3032480 | 6/2016 |
| EP | 3 076 253 A1 | 10/2016 |
| EP | 3 086 193 A1 | 10/2016 |
| JP | 2008-201101 A | 9/2008 |
| JP | 2016-010145 A | 1/2016 |
| WO | 2016/057386 A1 | 4/2016 |

OTHER PUBLICATIONS

Non-Final Office Action for U.S. Appl. No. 141675,129, dated May 4, 2017, 58 pages.
Rockwell Automation. The Power of Collaboration Working for you: PartnerNetwork Solutions from Rockwell Automation; Win-911 Software; Publication ENCOMP-BROO7B-EN-P—Dec. 2013.
Extended European Search Report for EP Patent Application Serial No. 16161305.4, dated Sep. 5, 2016, 10 pages.
European Office Action for EP Patent Application Serial 16161305. 4, dated Oct. 10, 2016, 2 pages.
Non-Final Office Action for U.S. Appl. No. 15/391,213, dated May 9, 2018, 79 pages.
Communication pursuant to Rule 69 EPC for EP Patent Application Serial No. 17186540.5 dated Apr. 4, 2018, 2 pages.
Communication pursuant to Rule 69 EPC for EP Patent Application Serial No. 17178556.1 dated Feb. 26, 2018, 2 pages.
Communication pursuant to Rule 69 EPC for EP Patent Application Serial No. 17178555.3 dated Feb. 26, 2018, 2 pages.
Extended European Search Report for European Application Serial No. 17200575.3 dated Apr. 17, 2018, 8 pages.
Extended European Search Report for European Application Serial No. 17200580.3 dated Apr. 17, 2018, 8 pages.
Chinese Office Action for Chinese Application Serial No. 201610187424.2 dated Mar. 9, 2018, 6 pages.
Communication Pursuant to Article 94(3) EPC Received for EP Patent Application No. 16161305.4 dated Sep. 8, 2017, 7 pages.
Extended European Search Report for EP Patent Application Serial No. 17178556.1-1871 dated Aug. 23, 2017, 10 pages.
Extended European Search Report for EP Patent Application Serial No. 17186540.5-1958 dated Sep. 28, 2017, 8 pages.
European Office Action for EP Patent Application Serial No. 16196582. 7, dated May 9, 2017, 2 pages.
Final Office Action for U.S. Appl. No. 14/675,129, dated Dec. 1, 2017, 63 pages.
Office Action for U.S. Appl. No. 14/928,305, dated Dec. 22, 2017, 24 pages.
Office Action for U.S. Appl. No. 15/241,354 dated Jan. 24, 2018, 95 pages.
Microsoft HoloLens demo onstage at BUILD 201, https://www.youtube.com/watch?v=3AADEqLIALk, 2 pages.
European Office Action for EP Patent Application Serial No. 16196582. 7, dated Feb. 14, 2018, 7 pages.
European Office Action for EP Patent Application Serial No. 17150085. 3, dated Dec. 19, 2017, 5 pages.
Extended European Search Report for EP Patent Application Serial No. 17178555.3 dated Jan. 8, 2018, 73 pages.
Non-Final Office Action received for U.S. Appl. No. 15/170,676, dated May 24, 2018, 163 pages.
Communication pursuant to Rule 69 EPC for EP Patent Application Serial No. 17200575.3 dated May 22, 2018, 2 pages.
Communication pursuant to Rule 69 EPC for EP Patent Application Serial No. 17200580.3 dated May 22, 2018, 2 pages.
Non-Final Office Action received for U.S. Appl. No. 14/987,399 dated Jun. 1, 2018, 83 pages.
Final Office Action received for U.S. Appl. No. 14/928,305 dated Jun. 5, 2018, 16 pages.
Final Office Action received for U.S. Appl. No. 15/241,354, dated Jul. 11, 2018, 80 pages.
Non-Final Office Action received for U.S. Appl. No. 15/240,161, dated Jul. 27, 2018, 54 pages.
European Office Action for European Patent Application Serial No. 16196582.7-1871 dated Jan. 31, 2017, 9 pages.
Extended European Search Report for European Application Serial No. 17200391.5 dated Jan. 18, 2018, 7 pages.
Final Office Action for U.S. Appl. No. 15/391,213, dated Oct. 25, 2018, 67 pages.
Non-Final Office Action for U.S. Appl. No. 14/928,305, dated Dec. 31, 2018, 19 pages.
Non-Final Office Action for U.S. Appl. No. 15/391,260, dated Nov. 30, 2018, 78 pages.
Final Office Action received for U.S. Appl. No. 15/170,676, dated Dec. 26, 2018, 46 pages.
Non-Final Office Action for U.S. Appl. No. 15/718,907, dated Dec. 14, 2018, 75 pages.
Chinese Second Office Action for Chinese Application Serial No. 201610187424.2 dated Sep. 4, 2018, 11 pages (Including English Translation).
Communication pursuant to Rule 94(3) EPC for EP Patent Application Serial No. 17186540.5 dated Feb. 21, 2019, 5 pages.
Non-Final Office Action for U.S. Appl. No. 15/718,856 dated Mar. 5, 2019, 68 pages.
Non-Final Office Action received for U.S. Appl. No. 15/170,676 dated May 13, 2019, 36 pages.
Final Office Action received for U.S. Appl. No. 15/718,856 dated May 24, 2019, 27 pages.
Communication pursuant to Article 94(3) EPC received for EP Patent Application Serial No. 17200575.3 dated Apr. 5, 2019, 5 pages.
Extended European Search Report received for EP Patent Application Serial No. 18205904.8 dated Apr. 3, 2019, 11 pages.
Makris et al., "Augmented reality system for operator support in human-robot collaborative assembly", CIRP Annals—Manufacturing Technology, vol. 65, No. 1, May 12, 2016, pp. 61-64.
Communication pursuant to Rule 69 EPC received for EP Patent Application Serial No. 18205904.8 dated May 20, 2019, 2 pages.

* cited by examiner

WORKFLOW TRACKING AND IDENTIFICATION USING AN INDUSTRIAL MONITORING SYSTEM

CROSS-REFERENCE TO RELATED APPLICATIONS

This application claims priority to U.S. Provisional Application Ser. No. 62/399,998, filed on Sep. 26, 2016, and entitled "WORKFLOW TRACKING AND IDENTIFICATION USING AN INDUSTRIAL MONITORING SYSTEM," the entirety of which is incorporated herein by reference.

BACKGROUND

The subject matter disclosed herein relates generally to industrial automation systems, and, more particularly, to memorializing of best practices within an industrial environment.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for learning industrial workflows is provided, comprising a discovery component configured to collect industrial data items from multiple data sources of an industrial facility, and to collect behavioral data from one or more client devices within the industrial facility, the behavioral data representing behaviors of one or more users associated with the one or more client devices; and a workflow generation component configured to generate workflow data based on a correlation of the industrial data items with the behavioral data, wherein the workflow data defines a sequence of user actions for performing a task relating to an industrial system.

Also, one or more embodiments provide a method for creating and delivering industrial workflows, where the method comprises collecting, by a system comprising at least one processor, industrial data from an automation system of a plant facility; collecting, by the system, behavioral data from one or more client devices within the plant facility, the behavioral data representing behaviors of one or more users associated with the one or more client devices; correlating, by the system, the behavioral data with at least a subset of the industrial data; and generating, by the system, workflow data based on the correlating, wherein the workflow data defines a sequence of user actions for performing a task relating to the automation system.

Also, according to one or more embodiments, a non-transitory computer-readable medium is provided having stored thereon instructions that, in response to execution, cause a system to perform operations, the operations comprising collecting industrial data items generated by industrial devices of an industrial system; collecting behavioral data from one or more client devices within an industrial facility associated with the industrial system, the behavioral data representing behaviors of one or more users associated with the one or more client devices; analyzing the behavioral data and at least a subset of the industrial data items; and generating workflow data based on a result of the analyzing, wherein the workflow data defines a sequence of user actions for performing a task relating to an industrial system.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
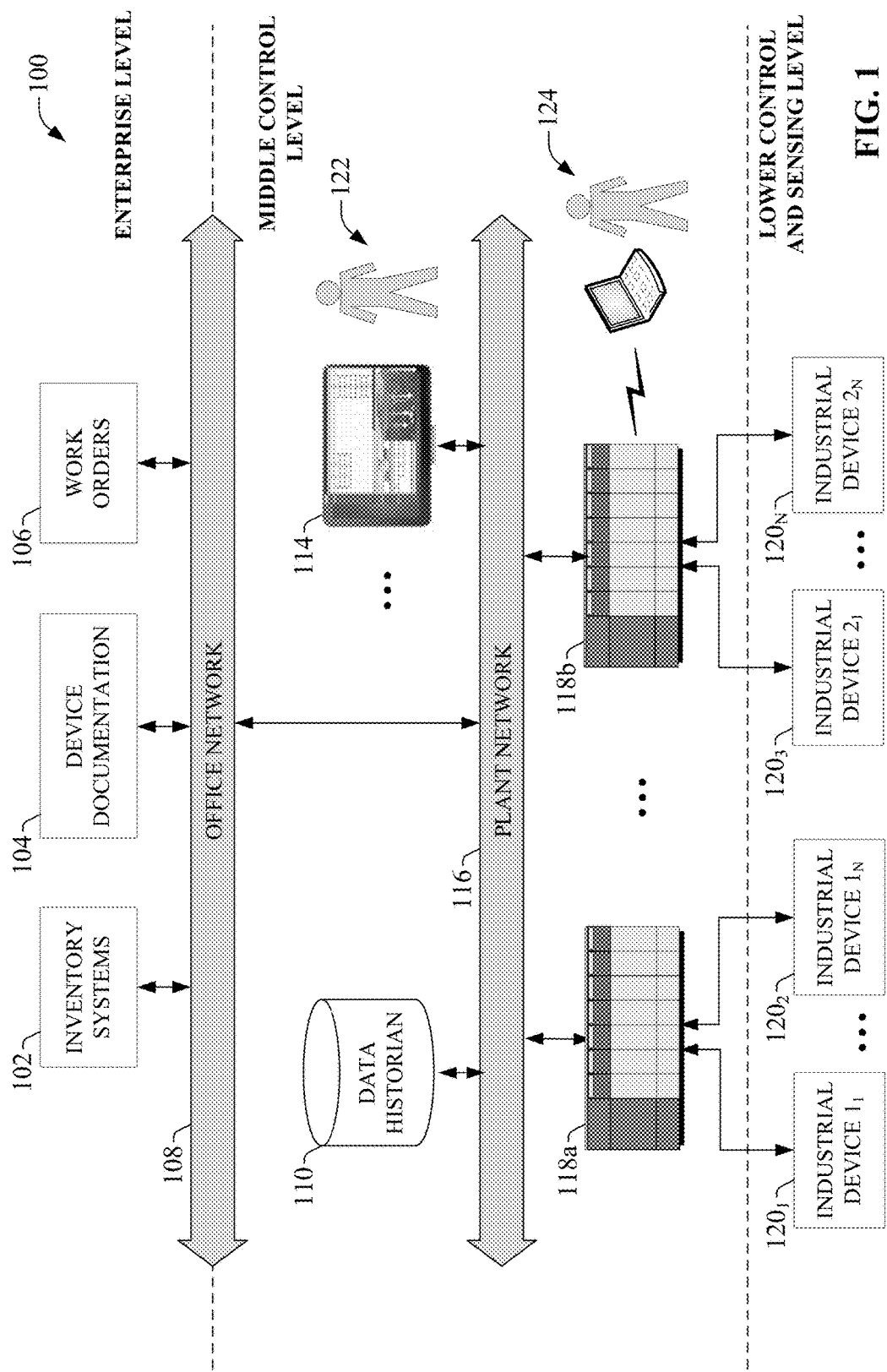
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such platforms.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial systems. One or more industrial controllers 118 may also comprise a soft controller executed on a personal computer or other hardware platform, or a hybrid device that combines controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.).

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer.

Effectively diagnosing and correcting machine, equipment, or device performance issues that arise within the plant environment requires maintenance personnel to have a specialized knowledge of the automation systems under their care. Plant personnel responsible for addressing such issues must have familiarity with the vendor-specific industrial devices or equipment in use throughout the plant (e.g., industrial controllers, motor drives, vision systems, industrial robots, etc.), as well as hands-on experience in dealing with the idiosyncrasies of particular system configurations that may be specific to a given plant. Moreover, the pool of maintenance personnel at a given plant facility often includes both veteran personnel who have a history of experience in diagnosing and correcting issues that are particular to the set of equipment and automation systems within the purview of the maintenance team, as well as relatively new employees who have less accumulated experience in dealing with the particular machines within their work area. For these newer employees, the knowledge gained by older personnel through years of hands-on experience must be relearned on an individual basis, typically through a combination of training and a lengthy trial-and-error approach to diagnosing problems and implementing countermeasures. Moreover, when more experienced personnel retire or otherwise leave employment of the plant facility, the knowledge accumulated by those technicians over the years becomes unavailable to the plant and to the other maintenance personnel, resulting in the loss of a valuable troubleshooting resource.

To address these and other issues, one or more embodiments of the present disclosure provide a workflow tracking and identification system that captures optimal employee workflows for addressing particular maintenance issues or performing certain operations, and renders these workflows at appropriate times in order to guide operators and maintenance personnel through optimal sequences for carrying out operations or addressing maintenance issues. The workflow tracking and identification system is built on a data indexing platform that unifies plant-wide data from multiple diverse sources under a common namespace, or federated data model. The system can monitor and index both plant-wide or enterprise-wide system data as well as employee behaviors, and identify correlations between operational outcomes and user workflows. In this way, the system can track and capture optimal employee workflows for addressing particular maintenance issues, operating a machine or production line, or achieving preferred production outcomes. By identifying and recording correlations between observed employee behaviors and production outcomes, the system can create a library of best practices that can be used as a training tool, as well as to provide substantially real-time guidance to maintenance staff and operators in connection with solving a problem or performing a task.

Figure 2:
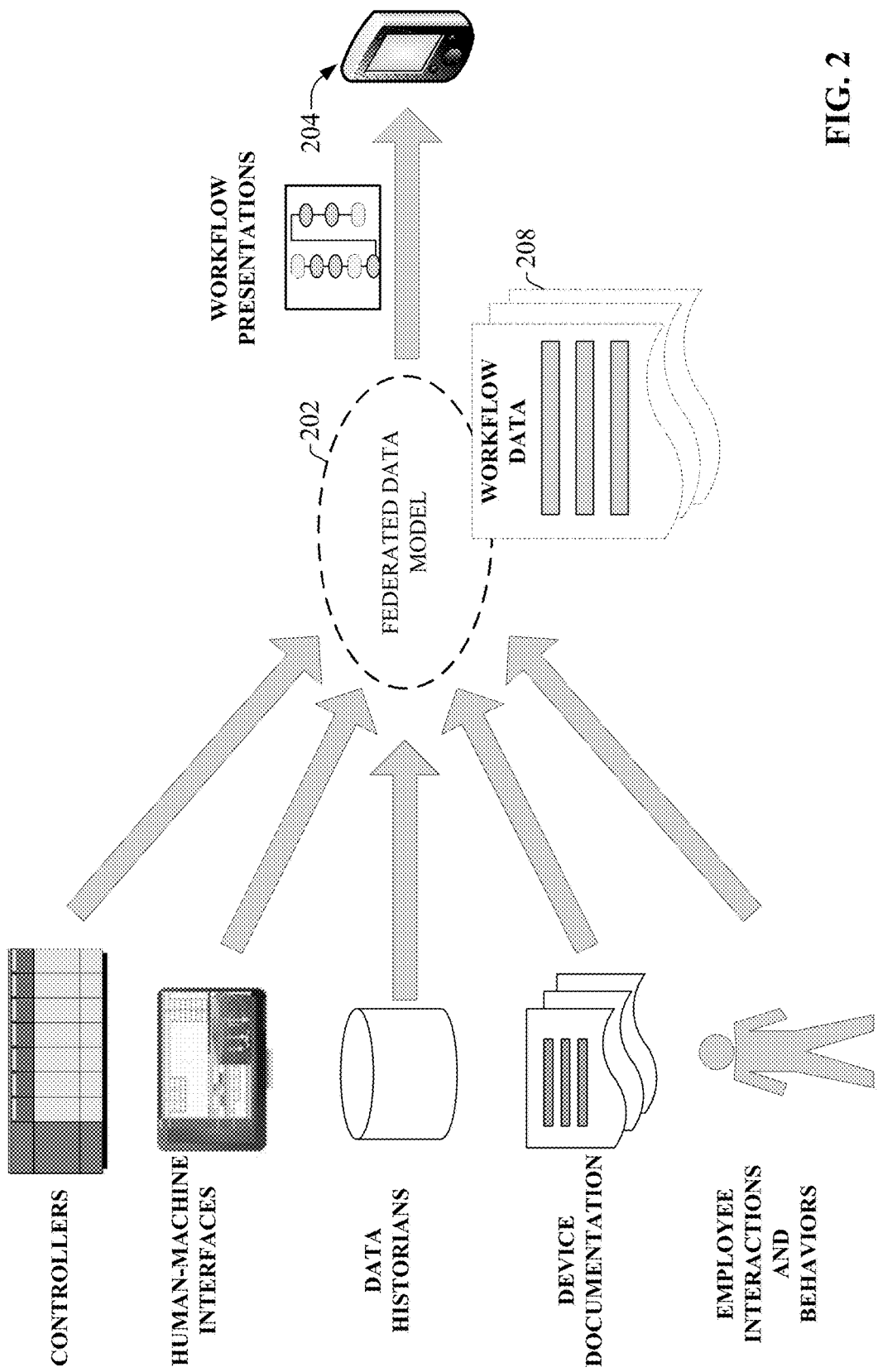
FIG. 2 is a conceptual diagram illustrating federation of industrial data by an indexing system.

FIG. 2 is a conceptual diagram illustrating federation of industrial data for use by the workflow tracking and identification system described herein. In one or more embodiments, the system collects and indexes data from multiple sources both across the industrial facility and external to the facility, including but not limited to industrial controllers, HMIs, data historians, device and system documentation repositories (e.g., drawings, manuals, knowledgebase articles, etc.), system inventory management systems, and/or other such platforms. The system also monitors behaviors of plant employees, including but not limited to interactions with operator panels and HMIs, histories of the employees' locations as a function of time, video feeds collected by employees' wearable computers, or other such user-specific behavior information. The system indexes and correlates this multi-platform data to yield a federated data model 202 that can be analyzed by the workflow tracking and identification system in order to correlate sequences of user behaviors with corresponding outcomes (e.g., production rates, number of downtime occurrences, duration of downtime occurrences or alarm conditions, continuous runtime statistics for specific machines or production lines, etc.). Based on these correlations, the system can identify preferred workflows for respective production scenarios or downtime issues, and record these workflows as workflow data 208. At appropriate times, the system can render these workflows in various formats to a selected user's client device or wearable computer when it is determined that such workflows will be useful to the user.

Figure 3:
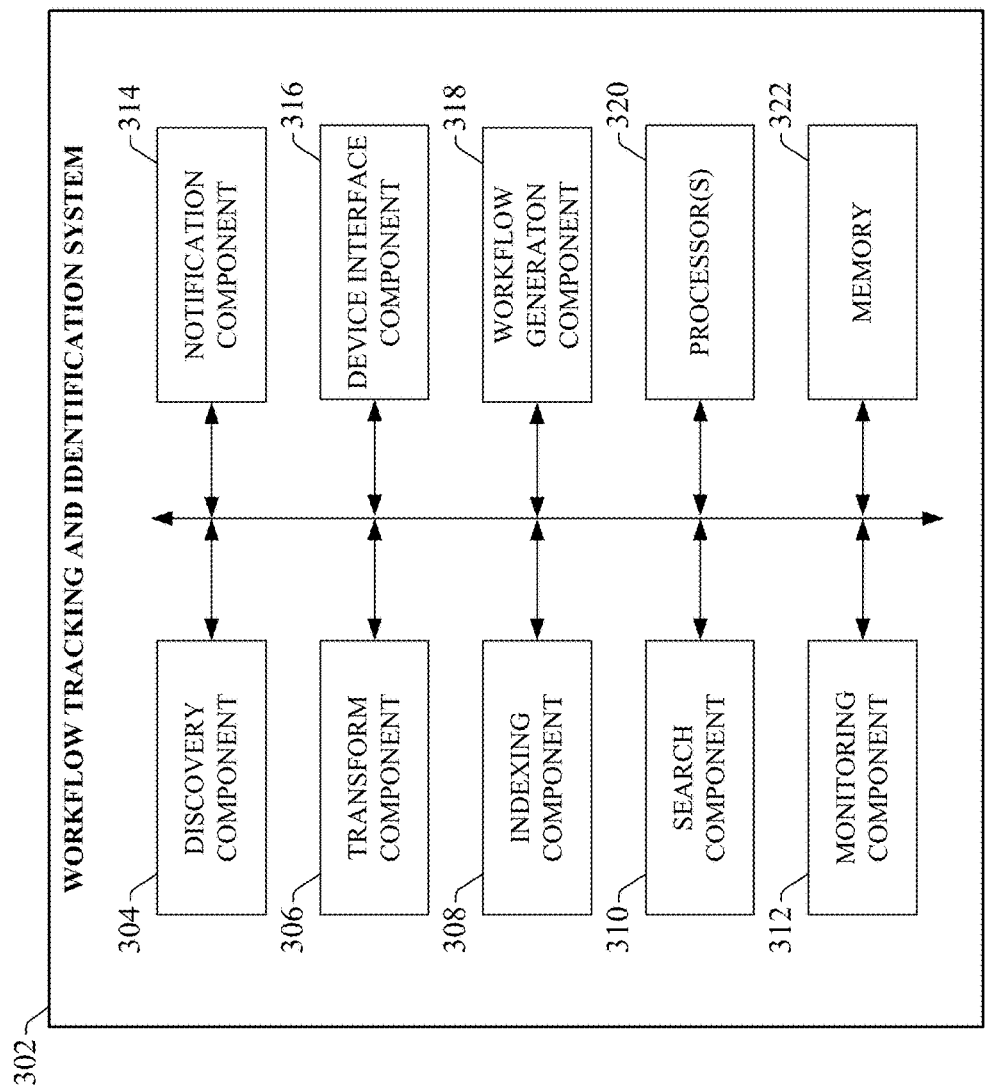
FIG. 3 is a block diagram of an example workflow tracking and identification system.

FIG. 3 is a block diagram of an example workflow tracking and identification system 302 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Workflow tracking and identification system 302 can include a discovery component 304, a transform component 306, an indexing component 308, a search component 310, a monitoring component 312, a notification component 314, a device interface component 316, a workflow generation component 318, one or more processors 320, and memory 322. In various embodiments, one or more of the discovery component 304, transform component 306, indexing component 308, search component 310, monitoring component 312, notification component 314, device interface component 316, workflow generation component 318, the one or more processors 320, and memory 322 can be electrically and/or communicatively coupled to one another to perform one or more of the functions of the workflow tracking and identification system 302. In some embodiments, components 304, 306, 308, 310, 312, 314, 316, and 318 can comprise software instructions stored on memory 322 and executed by processor(s) 320. Workflow tracking and identification system 302 may also interact with other hardware and/or software components not depicted in FIG. 3. For example, processor(s) 320 may interact with one or more external user interface devices, such as a keyboard, a mouse, a display monitor, a touchscreen, or other such interface devices.

Discovery component 304 can be configured to gather information from one or more industrial automation devices and other data sources both internal and external to an industrial environment. Information gathered by the discovery component 304 can include, but is not limited to, industrial device identification and configuration data, device programming, historical data, networking information, device documentation, product inventory information, audio and/or visual information submitted by one or more client devices, operator behaviors and biometrics, troubleshooting information from device vendors' technical support web pages, etc. The discovery component 304 can also be configured to discover interdependencies between the data items, as well as discovering the effects of certain monitored user behaviors or actions on specific machine operations or industrial processes.

Transform component 306 can be configured to transform and tag the data discovered by or submitted to the discovery component 304 prior to indexing. This can include, for example, transforming heterogeneous data items discovered on different types of data platforms to a homogeneous format for indexing under a common namespace, tagging the discovered data with relevant contextual information—e.g., a plant, production area, machine, or device on which the data was discovered; geo-tag information; a relationship or interdependency between a given data item and another data item; a data platform corresponding to the data item (e.g., industrial control program, HMI application, knowledgebase article, device documentation, etc.)—or other data modifications.

Indexing component 308 can be configured to generate a federated data model (e.g., federated data model 202) defining locations and sources of data items throughout the industrial system, as well as relationships between the data items, based on the discovered and transformed data. Indexing component 308 can also index user-specific information, including but not limited to sequences of user behaviors (e.g., operator interactions with control panels or HMIs), multimedia information collected from the user's immediate surroundings, user locations, biometric data, and other such information. The resulting federated data model is capable of identifying sources of specific data items or tags, as well as relevant contextual data relating to a specified data item.

Search component 310 can be configured to submit search queries to the federated data model and retrieve search results in response to explicit searches for relevant workflows submitted via a user's client device. Monitoring component 312 can be configured to monitor the indexed data items for defined trigger conditions, and to submit automated queries to the federated data model in response to detection of a trigger condition. The defined trigger conditions can correspond to conditions indicative of a performance or operational issue relating to the industrial system (e.g., a downtime condition, an abnormal condition, a current or predicted non-optimal operation condition, etc.). For example, the monitoring component 312 may initiate a search in response to detecting a plant condition for which a countermeasure workflow is available, in response to a determination that a user's current location relative to an automation system or industrial device merits delivery of a recommended workflow relevant to the automation system or device, or in response to other such detected conditions.

Notification component 314 can be configured to send notifications to one or more selected recipients in response to detection of a trigger condition by monitoring component 312. The notification can include additional information about the performance issue corresponding to the trigger condition, where the additional information is retrieved from the federated data model based on the automated search query submitted by the monitoring component 312 in response to the trigger. The notification component 314 can work in conjunction with the workflow generation component 318 such that, in addition to providing the notification, the system 302 renders a relevant workflow via a client device or wearable computer, where the workflow provides guidance for addressing the issue.

Device interface component 316 can be configured to exchange information between the workflow tracking and identification system 302 and a wearable computer or other client device having authorization to access the system. For example, the device interface component 316 can receive contextual information about a particular user based on a monitoring of the user's wearable computer or other client device, as well as deliver search results, notifications, workflow presentations, and/or augmented reality presentations to the wearable computer or client device.

Workflow generation component 318 can be configured to analyze the industrial and behavioral data indexed by indexing component 308, identify correlations between certain operator behaviors and plant process outcomes, and generate workflow data that can be used to generate a workflow presentation on a user's client device or wearable computer. The workflow generation component 318 associates each set of generated workflow data with the industrial devices or automation systems to which the workflows relate, so that a relevant workflow can be selected and presented to the user in response to detection of events occurring on those devices or systems. These workflow presentations represent preferred operator actions or sequences of actions that should be carried out in order to address a detected issue relating to the corresponding devices and systems.

The one or more processors 320 can perform one or more of the functions described herein with reference to the systems and/or methods disclosed. Memory 322 can be a computer-readable storage medium storing computer-executable instructions and/or information for performing the functions described herein with reference to the systems and/or methods disclosed.

Figure 4:
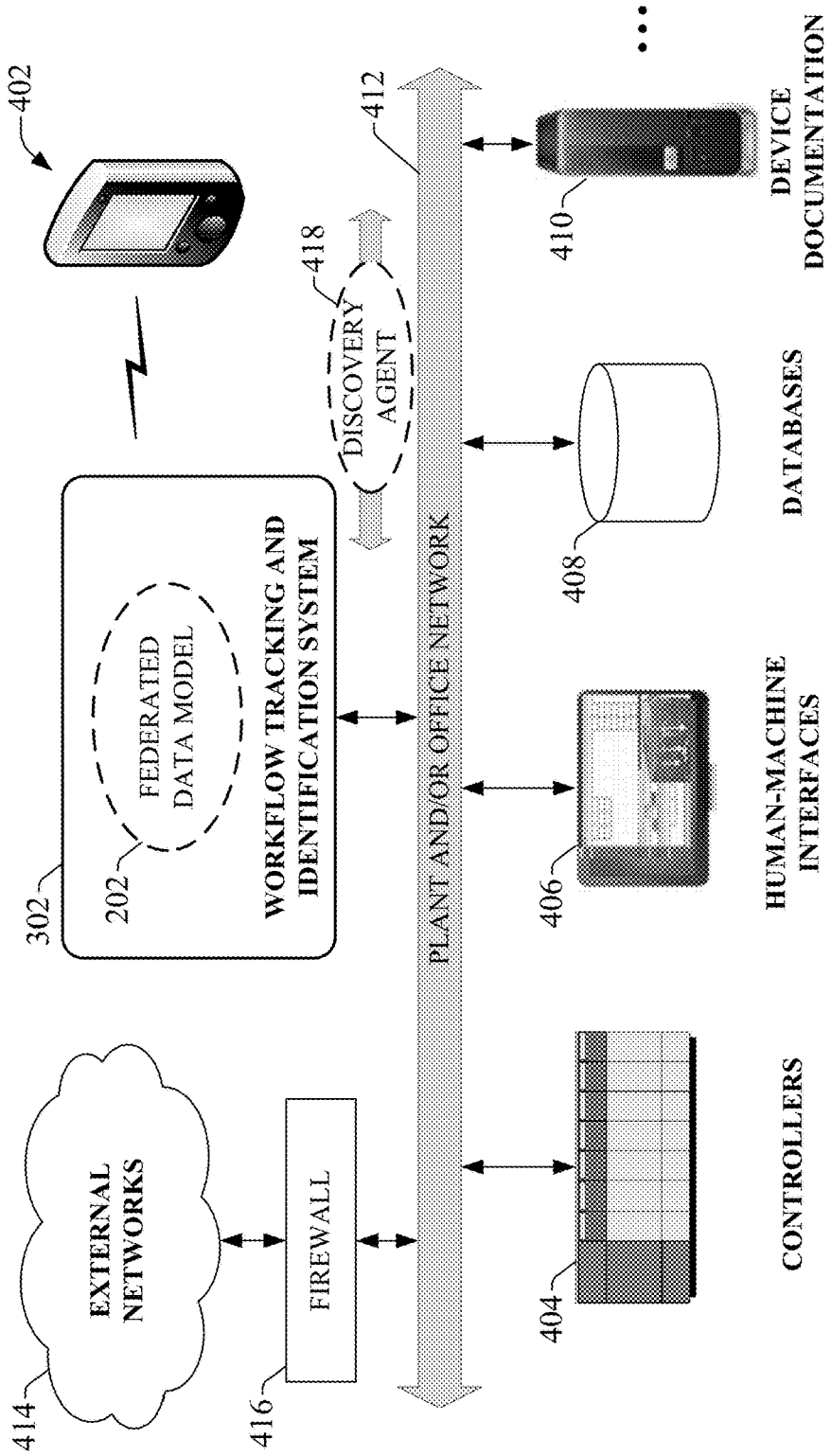
FIG. 4 is a block diagram of a generalized example architecture including a workflow tracking and identification system that discovers and indexes multi-platform data throughout an industrial environment, and leverages this data to generate and deliver workflow presentations to a user's wearable computer or other client device.

FIG. 4 is a block diagram of a generalized example architecture including a workflow tracking and identification system 302 that discovers and indexes multi-platform data throughout an industrial environment, and leverages this data to generate and deliver workflow presentations to a user's wearable computer or other client device. It is to be appreciated that the techniques described herein for discovering and indexing industrial data generated within a plant environment are only intended to be exemplary, and that any technique for gathering and indexing data for use in generating workflow presentations is within the scope of one or more embodiments of this disclosure.

The example industrial environment depicted in FIG. 4 includes one or more industrial controllers 404, HMIs 406, databases 408 (e.g., data historians, employee databases, inventory databases, etc.), and device documentation repositories 410. The industrial environment may also include other sources of industrial data not depicted in FIG. 4, including but not limited to product inventory tracking systems, work order management systems, etc. Data sources 404-410 reside on a plant and/or office network 412. In some scenarios, data sources 404-410 may be distributed across multiple networks within the plant facility; e.g., a plant network and an office network communicatively connected through a firewall device or other network infrastructure device. Network 412 may also have access to external networks 414 such as the Internet (e.g., via firewall 416).

Workflow tracking and identification system 302—which also resides on network 412 in this scenario—discovers and indexes data items that are available in the disparate data sources 404-410 as well as on the external networks 414. The system also indexes relationships between the data items. This can include, for example, recording instances of the same data item residing in multiple data sources (e.g., recording that a data tag corresponding to a particular temperature measurement within one of the industrial controllers 404 corresponds to a data tag within one of the HMIs 406 for displaying the temperature measurement on a display screen), observing that values of certain data items are a function of other data items (e.g., an output coil associated with a first data tag in a ladder logic program is set based on a value of a second data tag used as an output condition for the rung), or other such relationships. In this way, the workflow tracking and identification system 302 automatically inventories a customer's industrial environment by discovering the industrial assets in use and their associated available data items. Workflow tracking and identification system 302 can also discover relevant data on data sources residing on the external networks 414, including but not limited to device or machine vendor documentation, relevant online knowledgebase articles, vendor product release information, etc. In some embodiments, the system 302 can discover available data items by deploying discovery agents 418 on network 412.

The workflow tracking and identification system 302 records the indexed information (that is, the discovered plant-wide data items and their relationships, as well as user behavior data) as a federated data model 202, which can be accessed and searched by a search component based on workflow queries submitted via a user's client device. The model 202 can also be searched by a monitoring component for delivery of automated and/or proactive notifications and associated workflows to the user's client device. Such dynamically delivered workflows can be based on current statuses of industrial devices and systems throughout the industrial enterprise, as well as contextual data collected for respective users, so that workflow presentations relevant to a current system condition and the users' current locations and/or contexts can be generated and delivered at appropriate times.

Figure 5:
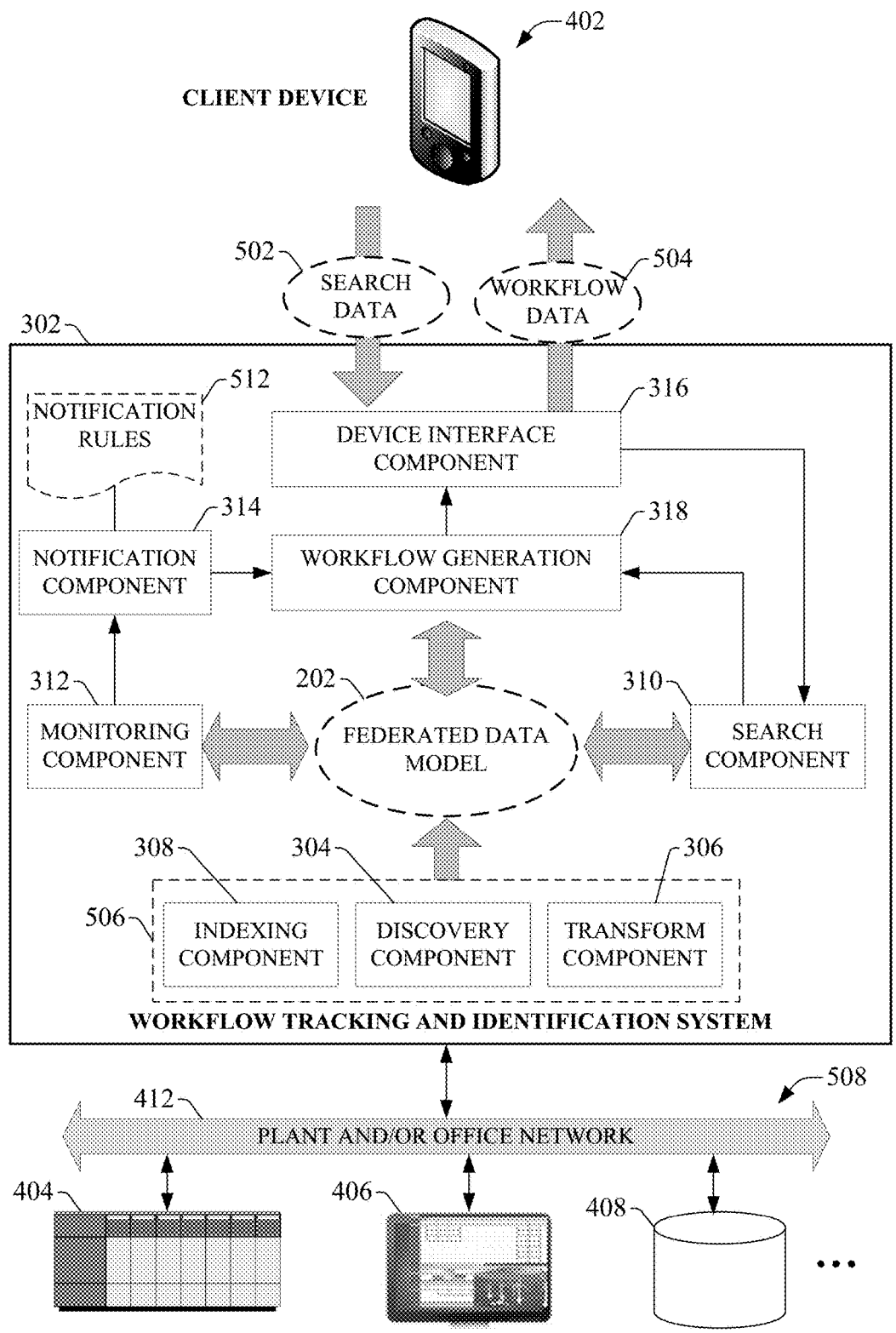
FIG. 5 is a block diagram illustrating components of the workflow tracking and identification system.

FIG. 5 is a block diagram illustrating components of the workflow tracking and identification system 302 in more detail. In some embodiments, the system 302 may be implemented on a server or other computing device that resides on plant and/or office network 412. In other embodiments, the system 302 may be implemented on a web server, allowing wearable computers or other client devices to remotely access the system 302 via a web connection. In still other embodiments, the presentation system may be implemented as a cloud-based service that executes on a cloud platform.

Indexing system 506—comprising discovery component 304, transform component 306, and indexing component 308—collects information about available data items distributed across a customer's industrial environment, and generates federated data model 202 representing a searchable unified view of the discovered data. The indexing system 506 is configured to discover data items on multiple disparate platforms, including but not limited to industrial controllers 404, HMIs 406, databases 408, electronic documentation libraries, inventory tracking systems, work order management systems, etc. As will be described in more detail herein, some embodiments of indexing system 506 can discover available data items by deploying discovery agents 418 on network 412. These agents traverse network 412 and identify devices in use throughout the plant, as well as the data items or tags, applications, and configuration information associated with those devices. Since a given industrial environment typically comprises a heterogeneous collection of devices of different types and vendors, and the data made available by these devices may comprise many different data types (e.g., controller tags, HMI tags, alarms, notifications, events, data values, tabular data, logs, configuration settings, diagnostic values, alarms, HTML pages, etc.), indexing system 506 can manage and deploy device-specific or platform-specific agents configured to extract and analyze information from specific types of devices or data platforms (e.g., controllers, HMIs, etc.). Some device-specific discovery agents can be configured to locate application project files stored on particular device types (e.g., configuration and/or program files on an industrial controller, screen configuration files on an HMI, etc.), and extract relevant information about the devices based on analysis of data contained in these project files. By leveraging device-specific and platform-specific agents, the indexing system 506 can discover and index data conforming to many different formats and platforms.

In order to unify this disparate heterogeneous data under a common platform for collective searching, the discovery agents can transform the collected data to a format understandable by the indexing system 506 (e.g., extensible markup language or other format), and the indexing system 506 can index this transformed data using a common indexing format compatible with the common search platform. The indexing system 506 then encodes this normalized representation of the discovered data in the federated data model 202. In addition to discovery of devices and their associated data via discovery agents deployed on the plant network, some embodiments of indexing system 506 can also be configured to receive uploaded configuration information from devices that support self-identification functionality, as will be described in more detail herein.

Indexing system 506 can also discover and record relationships—both explicit and inferred—between discovered data items. In some embodiments, the indexing system 506 may record these relationships by tagging discovered data items and building the search index based on these tags, such that related data items share common tags. In some scenarios, these tags may be explicitly defined by a system developer such that the indexing component determines which predefined tags should be applied to newly discovered data items.

As will be described in more detail herein, indexing system 506 can also build portions of federated data model 202 based on data obtained by and received from a user's wearable computer or other client device. Such data may include, for example, a history of the user's location over time, user interactions with an industrial system, multimedia data, RFID data, optically scanned data, or other such data.

Using some or all of these techniques, the indexing system 506 can automatically build a model of the customer's industrial environment, including the disparate and multi-platform devices in use throughout the plant, their associated available data items, and relationships between these data items. This eliminates the need for plant personnel to have full knowledge of the industrial assets in use throughout the plant, since indexing system 506 can automatically inventory a given industrial environment and record discovered devices and data in federated data model 202.

Once created by the indexing system 506, federated data model 202 can be searched by search component 310 based on search data 502 received from a user's wearable computer or other client device (in the case of explicit manual searches), or by a monitoring component 312 that facilitates automated searching and workflow generation. For example, in the case of manual searches, a user may submit search data 502 to the system 302 requesting a workflow relating to a particular procedure the user wishes to undertake. To this end, the device interface component 316 may be configured to generate and deliver a user interface display to the client device 402 that prompts the user for search criteria that can be used by the search component 310 to identify a desired workflow. In one or more embodiments, the user interface display may provide fields that allow the user to enter an identifier of an industrial system, device, or process; an abnormal condition relating to an industrial process; or other such criteria. Since the federated data model 202 inventories industrial systems and devices throughout the industrial enterprise, some embodiments of the user interface display may present a list of available industrial systems and/or device for selection by the user, and provide these selections to the device interface component 316 as the search data 502.

In response to receipt of search data 502, the device interface component 316 passes the search data to the search component 310, which searches federated data model 202 for indexed information relating to the automation systems or devices identified in the search data. This can include identifying any pre-generated workflows associated with the identified systems and/or devices that have been created by workflow generation component 318. The search component 310 can instruct the workflow generation component 318 to deliver these relevant workflows to the client device 402 (via device interface component 316) as workflow data 504. When received and executed on client device 402, this workflow data 504 causes client device 402 to render the relevant workflow as a graphical guide that can be referenced by the user in order to carry out a procedure defined by the workflow. As will be described in more detail below, these workflows are generated by workflow generation component 318 based on an analysis of the federated data model together with monitored behavior data of a plurality of users over time.

The workflow generation component 318 can customize the workflow data 504 based on contextual information collected for the user, including but not limited to a type of client device 402 on which the workflow will be presented. For example, if the client device 402 is determined to be a handheld phone, the workflow data 504 may be configured to render the workflow as a scrollable series of alphanumeric instructions, with pictorial references as needed. If documentation is available for an industrial device to which a particular step of the work relates, the workflow may include links to such documents embedded within the relevant workflow step, allowing the user to access additional information that may assist in carrying out that step of the workflow.

Alternatively, if the client device 402 is identified as a wearable computer through which the user views his or her surroundings, the workflow data 504 may be configured to present the workflow as graphical and/or alphanumeric overlays over the user's field of view. Such overlays may include graphical icons that are positioned at locations within the user's field of view to identify particular devices or machine components to which the user's attention should be focused in connection with a particular step of the workflow.

Client device 402 can exchange data with the workflow tracking and identification system 302 via device interface component 316, which may comprise a wired or wireless network interface, a near field communication interface, or other such device interface suitable for the particular platform on which the presentation system is implemented. In some embodiments, device interface component 316 may be configured to verify an authorization of the client device to access the system 302 prior to allowing search data 502 to be submitted by the client device. The device interface component 316 may authenticate the client device 402 or its owner using password verification or biometric identification, by cross-referencing an identifier of the wearable computer with a set of known authorized devices, or other such verification techniques.

In addition to supporting explicit manual search of workflows, system 302 can include a monitoring component 312 that facilitates automated, proactive presentation of workflows to a user in response to detected issues requiring action by the user. To this end, the workflow tracking and identification system 302 may include a monitoring component 312 configured to monitor one or more performance or operational metrics of an industrial system in order to identify issues requiring attention by an operator or maintenance technician. In response to detection of a performance or operational issue, the monitoring component 312 can perform an automated search of federated data model 202 to collect search results relevant to the detected issue. A notification component 314 can then initiate delivery a notification of the detected issue together with a suitable workflow to one or more client devices associated with selected plant personnel determined to be best suited to address the issue.

In an example embodiment, monitoring component 312 may monitor selected data items of industrial system 508 according to defined monitoring rules. The monitoring rules can define, for example, which data tags of the various data platforms distributed across industrial system 508 are to be monitored, as well as criteria indicative of performance issues that, when determined to be true, will trigger an automated search and personnel notification. The monitoring rules can also define which employees are to be notified in response to each type of detected performance issue. The monitoring rules may also associate specific plant personnel with corresponding automation systems or production areas for which those personnel are responsible, so that notifications relating to those systems or areas will be directed to the appropriate personnel.

Figure 6:
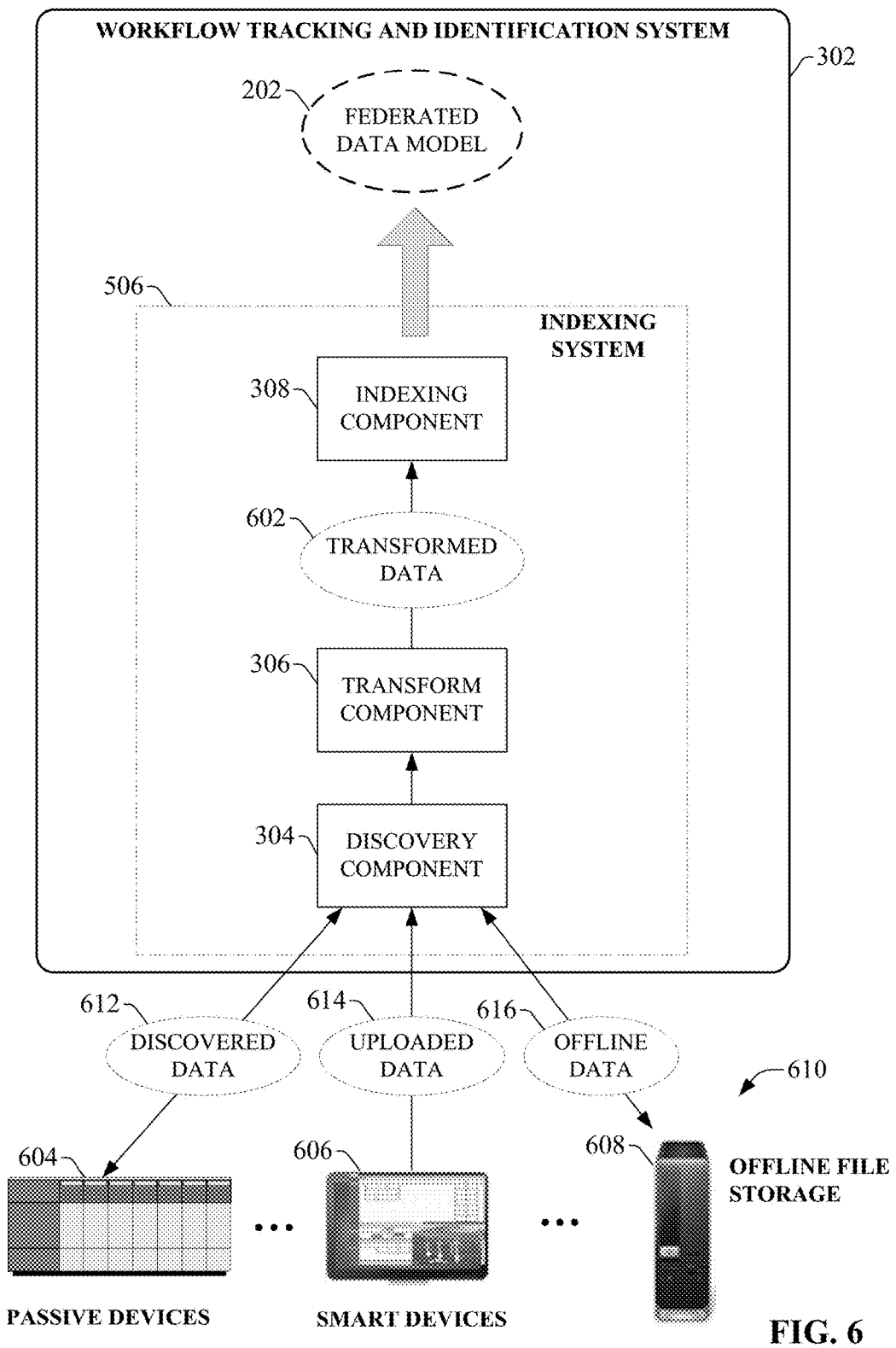
FIG. 6 is a block diagram that illustrates processing performed by the indexing system of a workflow tracking and identification system.

FIG. 6 is a block diagram that illustrates processing performed by the indexing system 506 of the workflow tracking and identification system 302. A given industrial environment may comprise a diverse, heterogeneous set of data sources 610. In order to unify the data available on these sources under a common namespace for search purposes, the discovery component 304 can be configured to discover data in a number of ways. Some devices within the plant environment may be passive devices 604, which only provide information regarding their available data items in response to a request from the discovery component 304 of the indexing system 506. Such a request may be initiated by the discovery agent 418 (see FIG. 4).

In an example scenario, when the discovery agent 418 discovers a new data source during traversal of the plant network, the agent will examine the data source to identify the data items on that device that are eligible for indexing in the federated data model 202. If the discovered data source is an industrial controller, for example, the available data items may comprise data tags or registers defined by the industrial controller's configuration and programming file. The discovery agent can also identify how and where the data items are used in the industrial controller's program (e.g., ladder logic, sequential function chart, structured text, etc.) so that this information can be indexed as well. For example, upon discovery of the industrial controller on the plant network, the discovery agent 418 may subsequently identify a tag named Tank1 defined in the controller's program file, representing a particular tank of an industrial batch process. In response to discovering this tag, the discovery agent can scan the control program to identify the routines and program locations (e.g., ladder logic rungs) on which Tank1 is referenced. The discovery agent 418 can also identify how each instance of Tank1 is used at each program location (e.g., output coil, normally open contact, function block argument, etc.).

The discovery agent may additionally identify other data items defined in the industrial controller that have a functional relationship with Tank1. For example, upon identifying a reference to Tank1 on an output coil of a rung of the control program running on the industrial controller, the discovery agent 418 can then identify the other data values and statuses defined on that rung that control the state of the Tank1 output coil, and record this relationship between Tank1 and each of the other data values and statuses. In some embodiments, the discovery agent 418 can perform additional scans of the control program to determine additional data values and statuses that affect the states of each of the related data items, since those additional data values/statuses also affect the status of the Tank1 output coil. The discovery agent 418 may iteratively cycle through the control program multiple times in this fashion in order to discover all relevant data items having a functional relationship with Tank1.

In another example, the discovered data source may be an interface terminal executing an HMI application for visualizing a controlled process. In this scenario, the discovery agent may identify the terminal and proceed to scan the tag list defined in the HMI application to identify the data tags referenced by the HMI. These data items can include HMI tags linked to data tags of a networked industrial controller for display of associated controller data values or statuses on one or more of the HMI screens, or for writing values to the controller tags via an input object rendered on an HMI screen (e.g., a data entry field, a virtual push-button, etc.). For each discovered HMI tag, the discovery agent can identify the display screens on which the HMI tag is registered, as well as the external controller tags corresponding to the HMI tag. In some scenarios, the HMI tag may be identified by the same name as the corresponding controller tag (e.g., Tank1), although this may not always be the case.

The discovery agent 418 can package the information collected as described above—including an identity of the data source and its type (e.g., industrial controller, HMI, knowledgebase, device documentation, etc.), data items discovered on the data source, locations of the data items within an application running on the data source (e.g., routine and rung of a ladder logic program, HMI screen, etc.), correlations between the data items, etc. —and send this information back to the discovery component 304 as discovered data 612. Since the discovery agent 418 is capable of performing appropriate analysis on a number of different types of data platforms (e.g., industrial controller, HMI, device documentation, etc.) in order to identify the data platform and its available data, the discovery agent 418 may pre-format the discovered data 612 to conform a format compatible with the indexing system 506 prior to returning the discovered data 612 to the discovery component 304. In this way, the discovery component 304 and its associated discovery agent can automatically normalize heterogeneous data from diverse data formats into a common, homogeneous format that can be collectively processed and indexed by the indexing system.

Figure 7:
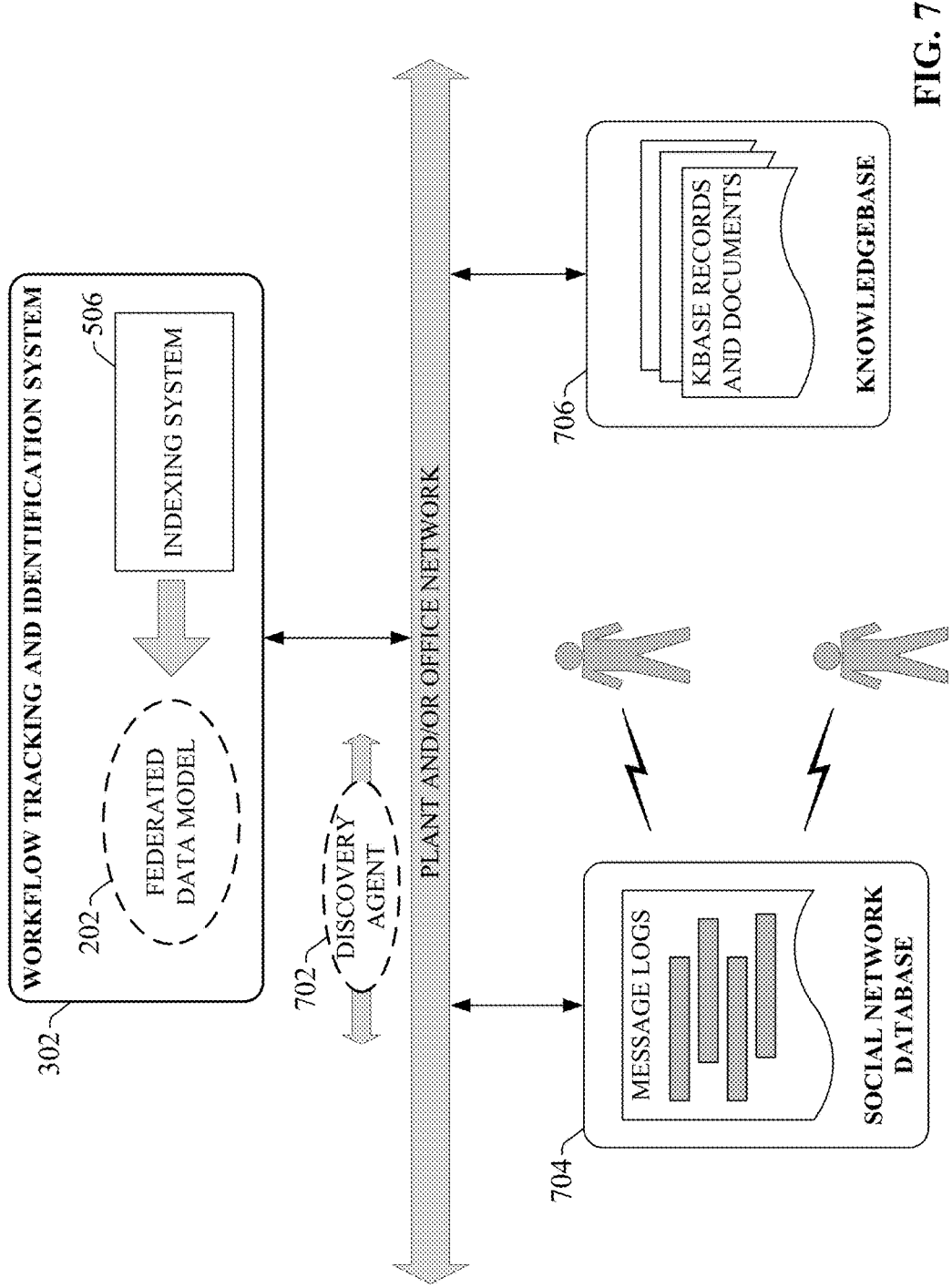
FIG. 7 is a diagram illustrating an architecture in which a discovery agent collects and indexes message log information.

In some embodiments, the discovery agent may also be configured to examine social networks used by plant employees in order to generate tags based on instant messaging discussions relating to a project or troubleshooting issue. Such instant messaging discussions may be included by the system 302 as part of a workflow for addressing maintenance issues similar to those discussed in the instant messaging discussions. FIG. 7 is a diagram illustrating an architecture in which discovery agent 702 collects and indexes message log information. In this example, a social network database 704 stores written communications between plant personnel. The written communications may comprise instant message logs, e-mail threads, text records, or other communication records. During data discovery, the discovery agent 702 can identify the social network database 704 and parse the stored message logs for keywords that may be used to associate the message logs with a particular work area, machine, process, or device. For example, the discovery agent 702 may determine, based on discovery of particular keywords within a message log, that a particular stored conversation was generated in connection with troubleshooting a particular machine or industrial device. Accordingly, the discovery agent 702 can report the presence of the message log to the discovery component with an instruction to tag the message log as being relevant to the machine or device. In this way, when the workflow generation component 318 analyzes the federated data model 202 to determine optimal workflows relating to the machine or device, the message log will be returned as a relevant result, allowing the workflow generation component to include a link to this message log as part of a workflow presented to a user. These logs may detail steps taken by maintenance personnel in connection with solving a particular issue with the machine or device, and are therefore flagged by the system as a relevant result when a search is performed on that machine or device.

In some embodiments, the discovery agent 702 may associate relevant supplemental information with a discovered message log based on keyword analysis of the log. For example, the customer may maintain a knowledgebase 706 on the plant or office network containing knowledgebase records and/or device documentation relating to particular devices or maintenance issues. Upon determining that a message log relates to a troubleshooting session for a particular machine or device, the discovery agent 702 (or discovery component 304) may generate an association between the log and a knowledgebase record or device document relating to that machine or device. Thus, when an event relating to the machine or device is detected, the workflow tracking and identification system 302 system can present, as part of a relevant workflow, a message log outlining steps taken in the past to address a maintenance issue pertaining to the machine/device, with links to relevant knowledgebase articles or device documents to provide supplemental information.

Figure 8:
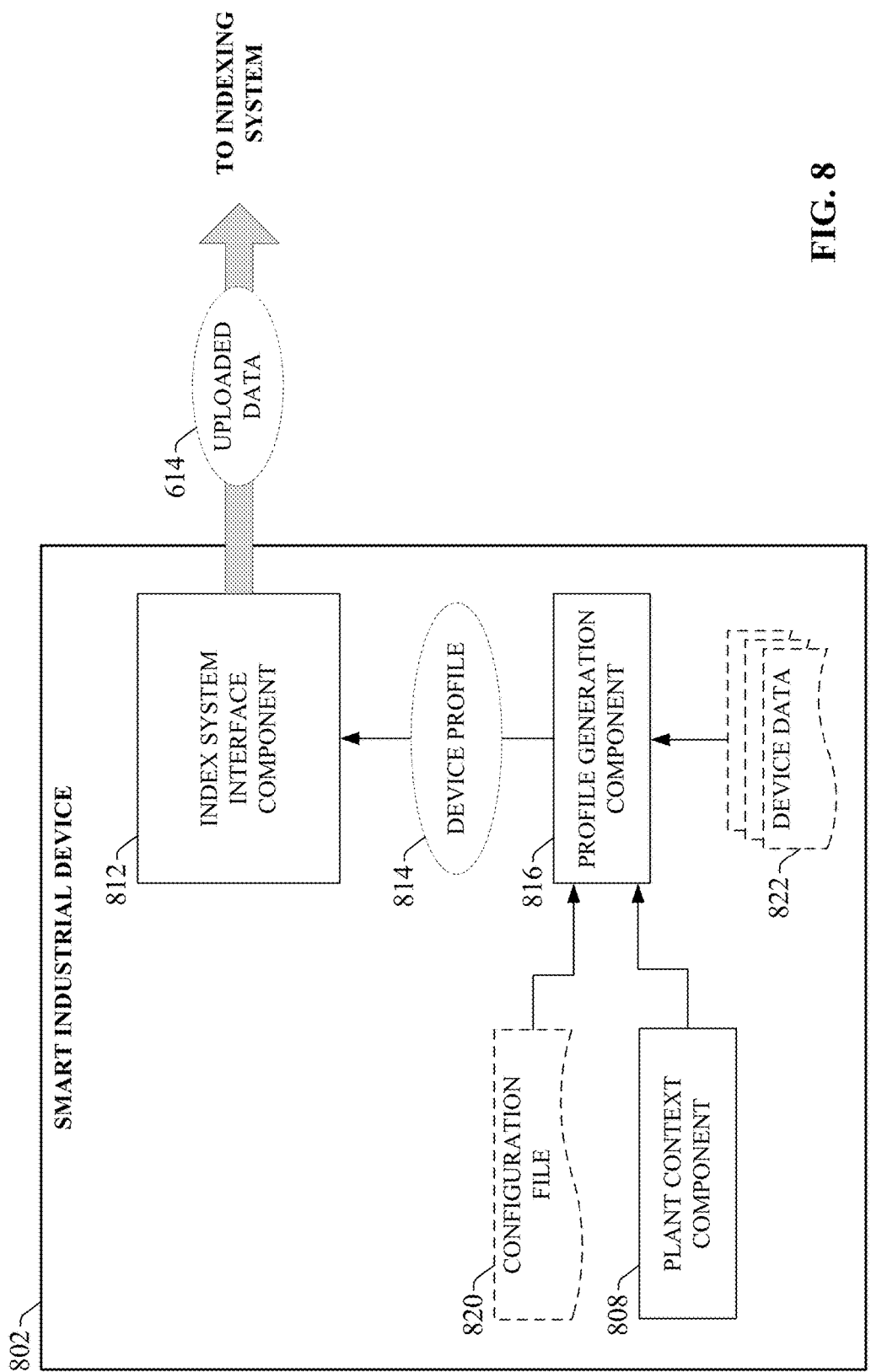
FIG. 8 is a diagram of an example smart device capable of self-reporting to an indexing system.

Returning now to FIG. 6, in addition to passive devices 604, the industrial environment may include one or more smart devices 606 having integrated self-reporting functionality. Such devices can provide uploaded data 614 regarding their identity and available data items to the indexing system 506 directly without the need for analysis by a discovery agent. Turning to FIG. 8, an example smart device capable of self-reporting to the indexing system 616 is illustrated. Smart device 802—which may comprise substantially any type of industrial device or data storage unit (e.g., an industrial controller, an HMI terminal, a motor drive, device documentation storage, etc.)—includes an index system interface component 812 configured to communicatively couple smart device 802 to the indexing system 506 and exchange data therewith; e.g., via a plant network or over a public network such as the Internet (for configurations in which the indexing system resides on a web server or cloud platform).

When smart device 802 is installed as part of an industrial automation system, index system interface component 812 can establish communication with the indexing system 506. In one or more embodiments, the index system interface component 812 can be configured to auto-discover the indexing system 506 on the common network. For example, the smart device 802 may be pre-configured with the identification of the indexing system to which the device is to provide its identity and configuration information (e.g., a name associated with the indexing system, a machine identifier, a cloud or web address, etc.), or may be configured to perform a search of the plant network for compatible industrial indexing and search systems that may be present on the network. Any suitable handshaking protocol may be used to establish communication between the smart device 802 and the indexing system.

Upon discovery of the search system, the smart device 802 can package and send relevant information about the device and its available data to the indexing system, which integrates the reported data items in federated data model 202. In some embodiments, a profile generation component 816 can generate a device profile 814 for smart device 802 to be sent to the indexing system 506 via index system interface component 812. Device profile 814 can convey information about smart device 802, including but not limited to an identity and type of the device, device data 822 available on the device, a context of the device within the industrial environment, any built-in displays or dialog screens (e.g., HTML pages) that provide access to the device's data, etc. In some embodiments, profile generation component 816 may collect configuration information encoded in a configuration file 820 stored on the smart device 802, which may be a control program, a configuration or parameters settings file, an application file (e.g., an HMI application or HTML page), or other such file. The profile generation component 816 can also identify available device data 822 on the device (e.g., real-time or historical data tags, etc.). In some embodiments, the profile generation component 816 can also identify relationships between the data items using techniques similar to those used by the discovery agent, including but not limited to the iterative relationship discovery process described above. The profile generation component 816 can package this information into a device profile 814, which is then sent to the indexing system as uploaded data 614 by index system interface component 812.

Some embodiments of smart device 802 may also include a plant context component 808 configured to collect additional contextual information about the smart device 802 for delivery to indexing system 506. Plant context component 808 can determine a context of smart device 802 within the plant or enterprise environment. For example, one or more embodiments of plant context component 808 can identify other devices and systems within its local environment and make a determination regarding a location of smart device 802 within a hierarchical plant context or device topology. Some embodiments of the federated data model may represent a given industrial enterprise in terms of multiple hierarchical levels and device hierarchies, where each level comprises units of the enterprise organized as instances of types and their properties.

Plant context component 808 can gather information that facilitates locating its associated smart device 802 within an organizational or device hierarchy in a number of ways. In one example, plant context component 808 can identify a topology of devices sharing a common network with smart device 802 and interconnections between the devices. For example, if smart device 802 is an industrial controller, plant context component 808 can identify one or more discrete or analog I/O devices connected to the controller (e.g. based on a configuration file 820 that defines the I/O module configurations for the controller). In addition, plant context component 808 can identify other controllers on the network and their role within the overall industrial enterprise (e.g., the production areas, workcells, or processes associated with the respective controllers), or a type of machine to which smart device 802 is connected (e.g., a palletizer, wrapper, conveyor, etc.). In some embodiments, plant context component 808 can also determine an identity of a particular network (e.g., a network name) to which smart device 802 is attached, as well as any security requirements associated with the network or device (e.g., necessary security certificates). This information can be leveraged (either by profile generation component 816 or an external application) to determine the device's location and role within the industrial automation system, since some networks may be dedicated to a particular production area. For networks that use certificate-based security, some embodiments of plant context component 808 can also interact with a Global Discovery Service (GDS) in order to determine a certificate authority and obtain the proper security credentials. In some implementations, the security credentials obtained by the device may be necessary to establish a secure interface between the device and the cloud platform before the device's information can be indexed.

By gathering information about the local device topology, plant context component 808 can facilitate identifying a location of smart device 802 within the enterprise hierarchy. In some embodiments, this determination of the location within the enterprise hierarchy can be made by plant context component 808 itself. Alternatively, profile generation component 816 can include information gathered by plant context component 808 in device profile 814 so that the indexing system 506 can accurately represent smart device 802 within the enterprise or device hierarchy.

Returning to FIG. 6, the indexing system 506 may also collect and index offline data about certain industrial devices rather than gather information about the devices directly from the devices themselves. In this regard, some industrial devices may have information about their configuration, programming, and available data items captured and stored as offline files stored on separate offline file storage devices 608. Accordingly, one or more embodiments of the discovery agent 418 can identify and process these offline files in a similar manner as described above in order to index these devices in the federated data model.

Figure 9:
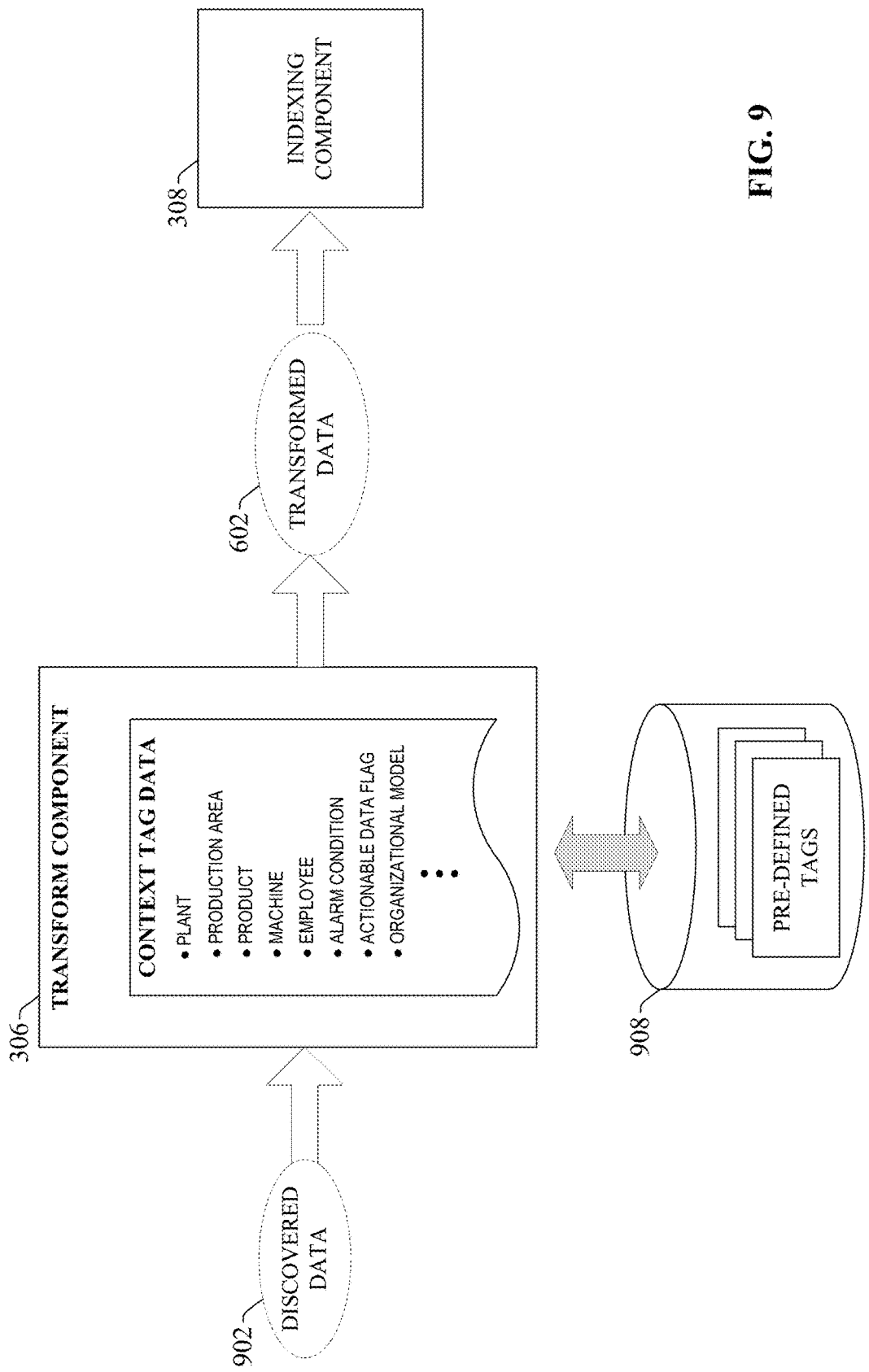
FIG. 9 is a block diagram illustrating transformation of discovered data by a transform component.

Transform component 306 can perform any necessary transformation on the data collected by discovery component 304 prior to indexing. This can include, for example, normalizing any data that was not appropriately formatted by the discovery agent 418, so that all collected data accords to a common format usable by the indexing system 506. In some embodiments, transform component 306 can also add contextual data or tags to the collected data items to achieve highly granular indexing for search purposes, as well as to facilitate subsequent discovery of interdependencies between the diverse and plant-wide data items. FIG. 9 is a block diagram illustrating transformation of discovered data 902 by transform component 306. As noted above, the discovery agent 418 (or discovery component 304) may add some contextual information to the discovered data items prior to sending the data to transform component 306. However, in some cases the transform component 306 may be able to add additional context to this data based on information not available to the discovery agent 418. In other scenarios, the discovery agent 418 may not have been able to contextualize all the discovered data due to limited available information about a given device (e.g., in the case of an older legacy device with limited capabilities).

Contextual data that can be added by transform component 306 for a given data item can include, but is not limited to, an identifier of a plant and/or production area at which the source of the data item resides; a machine or product to which the data item relates; one or more employees to be associated with the data item (e.g., based on the production area, shift during which the data item was collected, etc.); a concurrent alarm condition determined to be relevant to the discovered data item; an actionable data flag indicating that the value of the collected data item requires a response from plant personnel; or a tag indicating the location of the data time within the context of a hierarchical organizational model of the plant (e.g., in terms of an enterprise level, plant level, work area level, machine level, control level, etc.).

In some embodiments, the transform component 306 can selectively annotate discovered data items with one or more pre-defined tags 908 or metadata defined in association with the indexing system 506. These tags may be used to contextualize the discovered data based on one or more user-defined tag categories based on tagging rules. For example, the user may define a tagging rule indicating that data collected from data sources within a particular workcell or machine of the plant are to be tagged with a pre-defined tag that associates the data items with a person, product, or other classifier for indexing and workflow generating purposes. The tags 908 allow the user to define relationships between sets of data that may not be automatically discoverable by the discovery component 304 and its associated discovery agents. In some embodiments, the indexing system may also be configured to maintain a user-defined system view that allows a user to selectively associate different devices under a combined unit of organization. This user-defined association can subsequently be used by the search system to ensure that all relevant devices are located in response to a search query. For example, when one device (and its associated data) is located within the logical hierarchy of the system defined by the federated data model in response to a search query, other devices having a user-defined association with the located device will also be identified and retrieved as a relevant search result. In some embodiments, these user-defined associations may also be made between selected data items stored on different devices (data-level associations), as well as between the device's themselves (device-level associations).

In some embodiments, the transform component 306 may also auto-generate tags for a given data item based on contextual information, including but not limited to rung comments associated with a controller tag, learned interdependencies between a newly discovered data item and a previously discovered data item (e.g., learn that Pump5 is associated with Tank1, and tag Pump5 as being associated with Tank1, or tag both Tank1 and Pump5 according to the larger system in which they operate), or other discovered contextual information. The indexing component 308 can associate similarly tagged data items in the federated data model 202 regardless of the platform in which they were discovered. For example, the indexing component 308 can associate common or related data items discovered, respectively, in an industrial controller, an HMI, and a data historian.

In still other embodiments, the transform component 306 may be configured to create new metadata items within its associated device in which to store information that can be used to contextualize other information. For example, some industrial devices may be designed to support custom object attributes that can store substantially any type of customizable information that can be used for indexing purposes. Such custom object attributes can store information about its associated device, including but not limited to the device's function within a larger industrial system. Index information can be stored in the custom object attributes to facilitate synchronization of indexes through subsequent passes through the controller. Based on information in such custom object attributes, some workflow information can be sent back to the device (e.g., a controller) to facilitate future synchronization.

Returning now to FIG. 6, the transform component 306 provides the transformed data 602 to indexing component 308, which indexes the discovered data and interdependencies therebetween in federated data model 202. The workflow tracking and identification system 302 can then submit dynamic search queries to the federated data model 202 for the purposes of generating and rendering workflows, as described above in connection with FIG. 4.

Figure 10:
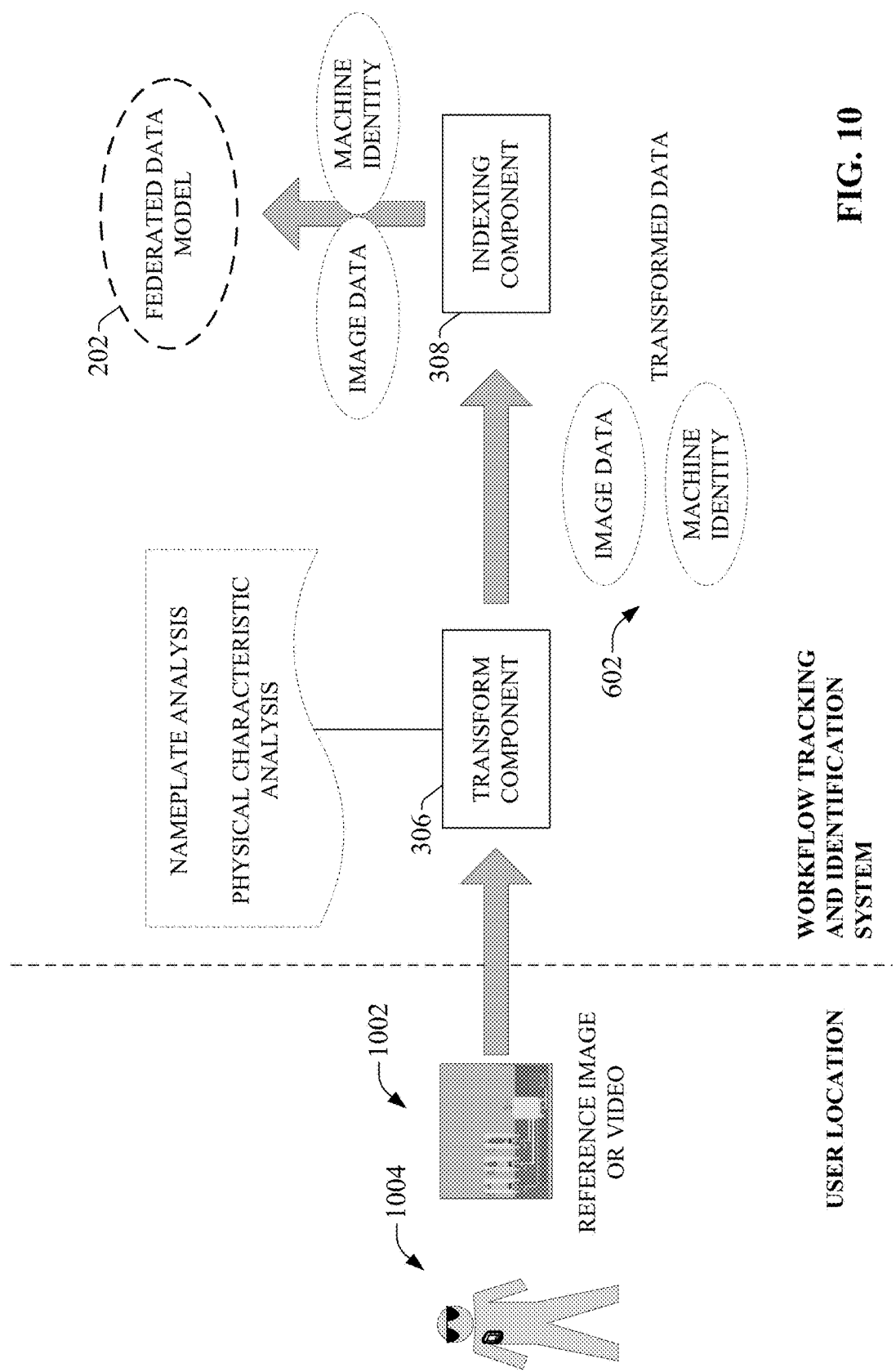
FIG. 10 is a diagram illustrating transformation of a submitted image or video into information that can be indexed in a data model.

In some embodiments, the system 302 can also be configured to index data collected by the user's wearable computer or other client device in data model 202. In such embodiments, the user can perform a scan of a portion of an industrial environment using his or her wearable computer or client device, and submit the scanned information to the system 302 to be translated and indexed into the data model 202. In an example scenario, the scanned information can comprise multimedia data (e.g., image or video information) obtained by the wearable computer. FIG. 10 is a diagram illustrating transformation of a submitted image or video into information that can be indexed in the data model. 202. In this example, a user 1004 performs a visual scan of an automation system comprising a number of machines and/or industrial devices using a wearable computer, resulting in image or video data 1002 representing the automation system. This image or video data 1002 is then submitted to the augmented reality presentation system for indexing (e.g., via a communication channel between the wearable computer and the device interface component 316 of the system 302). The transform component 306 can be configured to analyze the received image or video data 1002 in order to identify device or equipment represented by the data.

For example, the transform component 306 may be configured to recognize nameplate information located on a particular motor or machine recorded in the image or video data 1002; e.g., by first identifying the type of the machine based on its shape or other characteristic features, and then analyzing the location on the machine where the nameplate is expected to be located, where the expected nameplate location is based on the type of machine. Once the nameplate information is discovered in the image or video data, the transform component 306 may perform optical character recognition or other suitable analysis to read and extract the information inscribed on the nameplate. The transform component 306 can then tag the multimedia file with this extracted machine identity information. Some embodiments of the transform component 306 may be configured to employ other methods of identifying machines and industrial devices—e.g., by recognizing other physical characteristics of the machines or devices—as an alternative to nameplate recognition. The resulting transformed data 602 comprising the image or video information and the machine identify information can then be sent to the indexing component 308, which indexes the machine or device identification information (and optionally, the multimedia file) in the data model 202 based on the contextual information applied by the transform component 306.

Some embodiments of the transform component 306 can also be configured to translate barcodes or Quick response (QR) codes affixed to devices or machines. For example, a user may scan or photograph a barcode or QR code attached to a device, machine, or product (e.g., a pin-stamped or laser-etched barcode affixed to a workpiece during the production process) using his or her wearable computer, wherein the barcode contains identification information about the associated component. The wearable computer can then submit identification information extracted from the barcode to the indexing system 506 for indexing within the data model 202. In yet another example, the wearable computer may extract information about an industrial device or its associated process directly from the device via near field communication (NFC) and submit the extracted information to the indexing system 506. This extracted information can include, but is not limited to, a device identifier, device status information read from a status word maintained on the industrial device, alarm data extracted from an alarm register, production statistics stored on one or more data tags, or other such information.

In some embodiments, other scanning technologies can be used to identify machines and/or devices that make up part of an industrial automation system. For example, some industrial devices may be provided with embedded radio-frequency identification (RFID) tags that contain identification information for the devices. Wearable computers or client devices having RFID reader capabilities can scan such devices in order to obtain the recorded device identification information and route this information to the indexing system of the workflow tracking and identification system.

Figure 11:
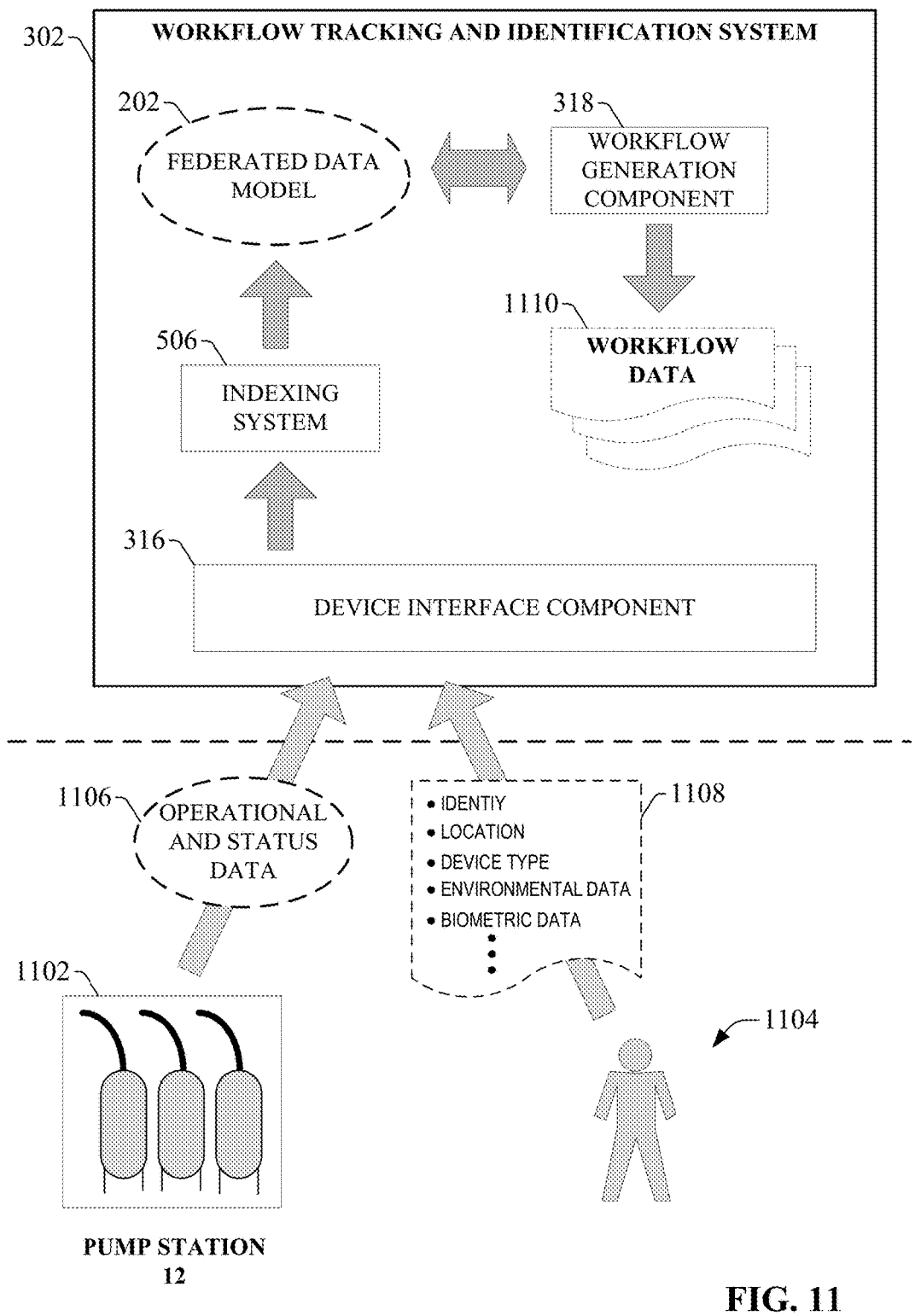
FIG. 11 is a diagram illustrating collection of user data together with plant operational and status data.

In addition to indexing available plant data as described above, workflow tracking and identification system 302 can also monitor and record operator behaviors during plant operation, learn correlations between sequences of operator behaviors and production or operational outcomes, and generate workflow data that records these behavior sequences in association with the outcomes. FIG. 11 is a diagram illustrating collection of user data 1108—including behavior data—together with plant operational and status data 1106 according to one or more embodiments. As described above, indexing system 506 can collect and index operational and status data 1106 from industrial devices and systems 1102 throughout the industrial enterprise. Simultaneously, the system 302 can collect user data 1108 for various users—typically plant employees—during plant operation. This information can be collected by device interface component 316 from a client device or wearable computer associated with the user 1104, from biometric equipment worn by the user, from multimedia devices that record the user's behaviors, or from other devices that facilitate collection of data relating to the user's location, state, and/or activities. For example, a client device carried by the user, or a wearable computer worn by the user, can establish a communicative link to the workflow tracking and identification system 302 via device interface component 316, which can confirm authorization of the user to access the system. As the user traverses the industrial environment, the device interface component 316 collects user data 1108 from the user's client device.

A number of different types of information can be collected for the user by the device interface component 316. For example, the identity of the user associated with the client device can be ascertained by the device interface component 316 based on a unique identifier retrieved from the client device or an explicit user identifier sent by the client device. The system 302 may also determine the user's role within the industrial enterprise (e.g., engineer, maintenance technician, plant manager, machine operator, etc.) based on a cross-referencing of the user's identity with a role database maintained by the system 302. The device interface component 316 can also track the location of the client device within the plant environment using any suitable technique (e.g., global positioning system techniques, triangulation, etc.). The device type can be identified by the device interface component 316 (e.g., based on the unique device identifier or other information detectable for the device) so that workflow presentations can be customized for display on the particular device type. If the user is viewing his or her environment via a wearable computer, the orientation of the wearable computer can also be monitored by the system 302, allowing the system 302 to determine the user's direction of sight as a function of time. Also, as the user views his or her surroundings through the wearable computer, the wearable computer may collect environment data (e.g., video and/or audio information, ambient measurements, etc.), which is also collected by the device interface component 316. These types of contextual and behavioral user data 1108 are only intended to be exemplary, and it is to be appreciated that any suitable combination of contextual data items can be collected by the device interface component 316 for tracking and identification of preferred workflows without departing from the scope of one or more embodiments described herein.

In addition to behavioral data collected directly from the user's client device, the system 302 can also infer user behaviors based on status information collected from control panel devices, HMIs, or other industrial devices. For example, the statuses of selector switches, push buttons, and other control devices of a control panel associated with a particular industrial automation system can be monitored by the system 302 in order to determine a timing and/or ordered sequence of control operations performed by an operator. In some embodiments, the system can also log the identity of the particular operator who carried out this sequence of control panel operations based on a correlation between the user's location at the time the control panel sequence was performed and a known location of the control panel within the plant. Other example inferred user behaviors can include, for example, a time at which a reset button of a particular control device was pressed, a navigation to a particular HMI screen, a timing with which a manufactured part is removed from or placed on a station of a production line (based on a monitoring of a part present photo-sensor mounted at the station), or other such inferred behaviors.

Figure 12:
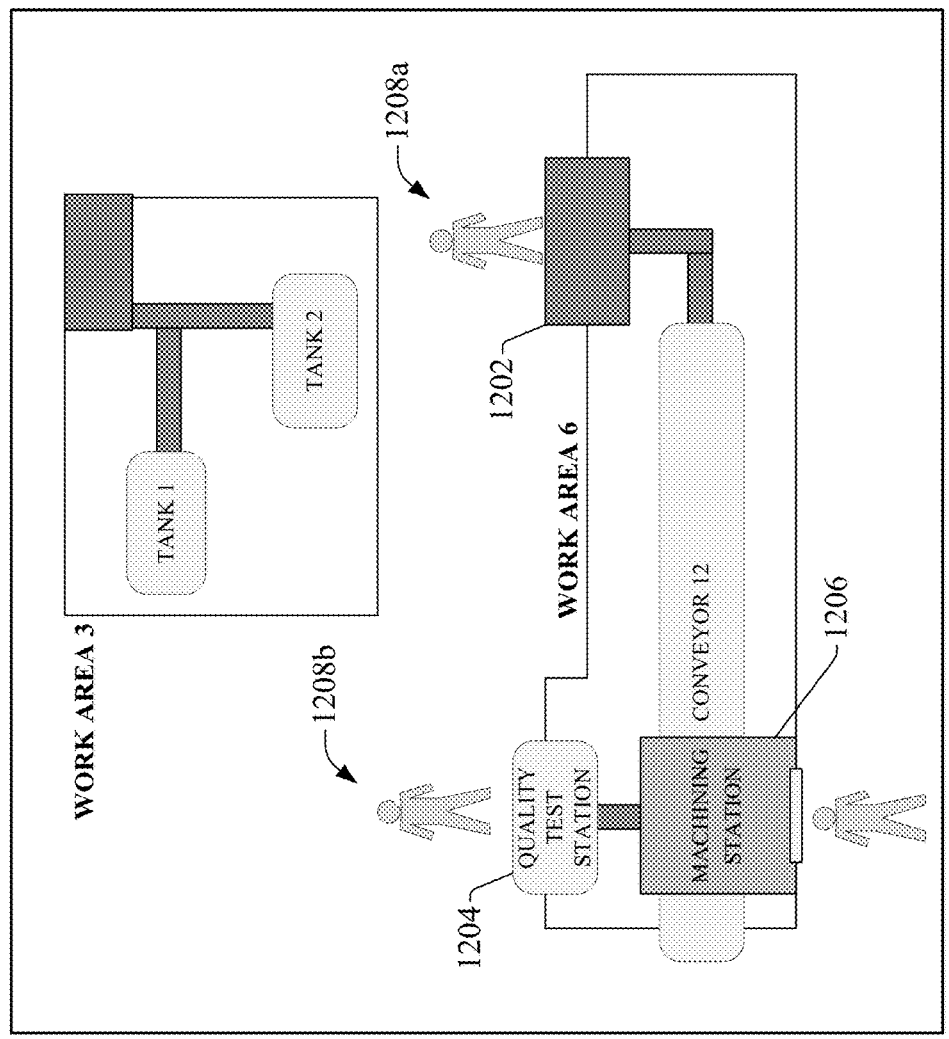
FIG. 12 is an example overview of an area within a plant.

System 302 can learn correlations between subsets of the monitored or inferred user behaviors and their corresponding impacts on performance of the industrial processes, systems, and devices within the plant. FIG. 12 is an example overview of an area within a plant. In this example, a number of users 1208a are monitored by workflow tracking and identification system 302 as the users operate and/or perform maintenance on various automation systems within the plant facility. Based on the users' monitored locations as well as known locations of the various industrial systems within the plant (as indexed in federated data model 202), the system 302 can determine when the users are positioned near the various automation systems, and, in some examples, when the users are near certain control panels or stations of the automation systems. The system 302 can also link inferred operator behaviors with these locations as part of a learned workflow. For example, the workflow generation component 318 may identify that user 1208a is near control panel 1202, and may further detect that, while the user 1208 is at this location, a series of push buttons, selectors switches, and/or other control panel input devices have been operated in a particular order. The workflow generation component 318 can also correlate this sequence of user behaviors with current or subsequent status information for the automation system associated with control panel 1202. For example, if the system 302 determines that the automation system is currently experiencing a particular downtime alarm condition that has caused the system to enter an abnormal state, and the workflow generation component 318 subsequently detects that the automation system returns to normal operation after the user 1208a performs a particular sequence of control panel operations, the workflow generation component 318 may infer that the sequence of operations carried out by user 1208a is a valid workflow for addressing the detected alarm condition.

The workflow generation component 318 may also determine that other behavioral steps should also be included in the workflow for addressing the alarm condition, based on other monitored or inferred actions that are performed prior to transition of the automation system from the abnormal state to the normal state. For example, the workflow generation component 318 may determine that, when the abnormal condition is experienced, user 1208a first places the automation system in semi-automatic mode by changing a position switch on control panel 1202 from the AUTO to the SEMI-AUTO position. The workflow generation component 318 then determines that the user manually returns one or more actuating devices (e.g., a part pushing arm, a retractable part stopper, a part gripping arm, etc.) to their respective home positions based on operation of manual control buttons on the control panel as well as the states of the various proximity or reed switches associated with the actuating devices. The workflow generation component 318 then determines that the user 1208a (or another user 1208b) has removed a manufactured part from a quality test station 1204 based on the user's detected location and a determination that a "part present" photo-sensor mounted on the quality test station 1204 has transitioned from a "part present" state to a cleared state. Finally, the workflow generation component 318 detects that the user 1208a returns the automation system to automatic mode based on operation of the selector switch on control panel 1202, and the system returns to normal operation.

The system 302 may detect variations of this workflow carried out over multiple instances of the detected alarm condition. For example, some operators may change the order of some steps, or may use a different set of steps for addressing the alarm condition, where the different set of steps may share some common steps with the originally detected workflow. Over time, the workflow generation component can refine the recorded workflow based on these variations, as well as inferences of which workflows provide best results when addressing the alarm conditions (e.g., which operations cause the automation system to recover more quickly, or result in less accumulated downtime for the machine). For example, if multiple different sequences of operations are detected as resulting in recovery of a machine from a particular alarm condition, the workflow generation component may perform comparisons of the total times required for each of the sequences to recover the machine, and select as the preferred workflow that which consistently recovers the machine with the least amount of total downtime.

Workflow generation component 318 may also incorporate specific user identities into the learned workflows. For example, workflow generation component 318 may learn, based on observation of the plant data and user behavior data, that one or more specific employees congregate at a particular location relative to an automation system when a certain alarm or downtime condition occurs. Accordingly, the workflow generation component 318 may associate the identities of these employees with the workflow for addressing that particular issue. In another scenario, the system 302 may learn, based on analysis of the plant data and user behavior data, that recovery of the automation system occurs more quickly when the issue is addressed by certain identified employees. Accordingly, the system 302 may link the workflow for the particular issue to those preferred user identities, such that the system 302 will subsequently direct notifications to those employees when the downtime condition is detected, or will inform other maintenance personnel that these identified users may be able to provide guidance in connection with addressing the detected issue.

In addition to generating workflows for addressing alarm or downtime issues, the system 302 can also learn workflows for carrying out operational tasks that result in optimal automation system performance or yield preferred production results. For example, the workflow generation component 318 may learn over time that a greatest product output of a particular automation system, or a greatest duration of total system runtime per shift, is achieved when a particular operator methodology is practiced. For example, it may be learned that machine downtime is minimized when the operator sets the system speed to be within a certain range, or when certain operating setpoints are set to be within determined optimal ranges. In another example, the system 302 may determine that a particular operator action—e.g., a manual acknowledgement, removal of a part from a station of the automation system, and adjustment of a setpoint, etc. —when performed at an identified stage of an operating system's cycle, repeatedly results in greater product throughput or lower cycle times relative to performing this operation during another stage of the cycle, or not performing the operation at al. Accordingly, the workflow generation component 318 can generate a workflow for operating the system that incorporates this step at the appropriate stage of the machine's cycle.

Returning to FIG. 11, workflow generation component 318 can record these workflows as workflow data 1110, where each set of workflow data 1110 is stored in association with the event or machine to which the workflow relates. For example, workflow generation component 318 may store a workflow determined to be effective for recovering from a particular alarm condition of a conveyor system in association with the relevant alarm, so that the workflow can be delivered to a user's client device in response to detection of the relevant alarm. Similarly, workflows associated with preferred operation of a given automation system will be tagged with an identifier of the relevant automation system, so that the workflow will be delivered to client devices in associated with users determined to be currently operating the relevant system.

Each set of workflow data 1110 comprises instructions that, when executed by the user's client device, cause the client device to render a graphical workflow that guides the user through the best procedure for addressing a detected performance issue or for achieving optimal performance of an automation system. Such workflows may define, for example, steps defining specific sequences of control panel interactions, steps instructing the user to remove a part from a particular station of a production line at a certain time, steps identifying a maintenance action to be performed (e.g., replacing a filter or other component), or other such instructions. If additional information is available for a given step are available (e.g., a manual for a device that is the focus of a particular step, a website or knowledgebase article for the relevant device, etc.), as discovered by the indexing system 506, the step may include a link that allows the user to navigate to this additional information if desired. The workflow generation component 318 can customize the presentation format for these instructions in accordance with the type of client device to which the workflow is directed, such that the workflow is rendered in a manner that makes use of the available display features of the client device or wearable computer.

By continuously monitoring user behaviors within the plant and learning the corresponding effects these actions have on various plant processes, the workflow tracking and identification system 302 can, over time, develop a library of workflows that are each associated with a particular machine, system, device, or alarm condition. The workflow generation component 318 can select suitable workflows from this library for delivery to selected client devices in response to determining that such workflows may be useful to a user given the current plant context.

Figure 13:
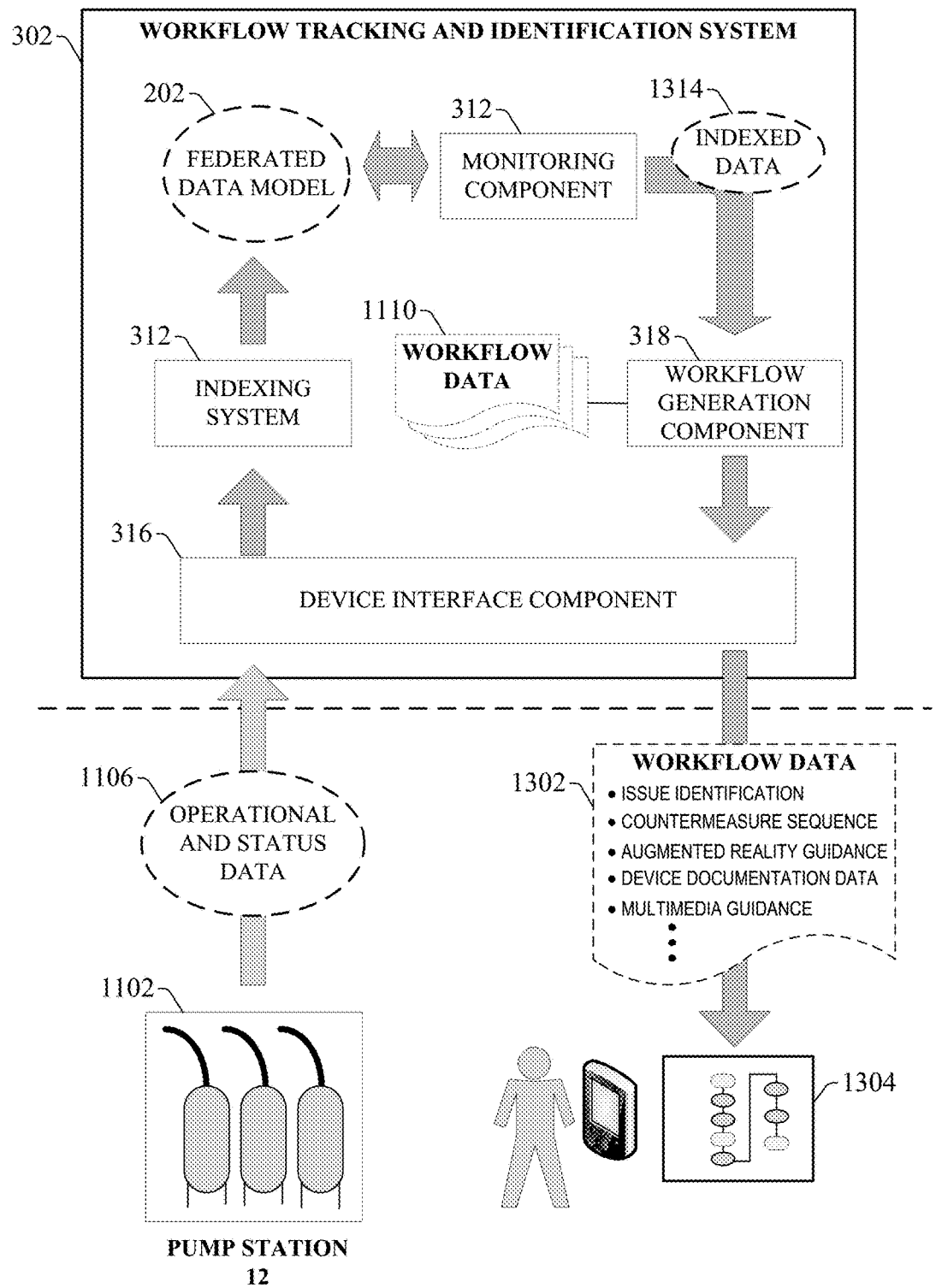
FIG. 13 is a diagram illustrating delivery of a workflow to a user's client device at appropriate times by a workflow tracking and identification system.

FIG. 13 is a diagram illustrating delivery of a workflow to a user's client device at appropriate times by workflow tracking and identification system 302. Although the system 302 allows a user to manually search for and retrieve particular workflows for a desired alarm or automation system (using search component 310), the example illustrated in FIG. 13 depicts a scenario in which the system 302 selects and delivers a workflow to a user dynamically in response to a detected condition.

As the indexing system 506 collects and indexes operational and status data 1106 from devices on the plant floor into federated data model 202, monitoring component 312 monitors selected data items indexed in the model 202, and initiates delivery of a suitable workflow 1304 in response to determining that one or more data items indicate a problem with an automation system or device that merits attention from one or more registered users. For example, based on current status and/or operational information for the various industrial devices indexed in the federated data model, monitoring component 312 can detect when an industrial device or system has generated an alarm or fault, experienced a downtime condition, performed an out-of-sequence operation, or other such condition. In some scenarios, the event detected by the monitoring component may not be an alarm or downtime condition, but rather may be a determination that a performance metric of an industrial process or machine has deviated outside an acceptable tolerance range, signifying a drop in production efficiency that may be correction through user intervention.

For industrial controllers that monitor and control operations of an industrial machine or process, the notification event detected by the monitoring component 312 may relate to the controller's internal operation (e.g., a controller fault) or to the machine or process being controlled. In the latter scenario, the alarm or fault conditions associated with the controlled machine or process may be pre-defined as part of the control program being executed on the industrial controller. For example, process parameter setpoint values, abnormal machine statuses, process alarm conditions, and other such notifiable conditions may be defined by a programmer within the industrial control program, and such conditions will be detected by the monitoring component 312 and used as the basis for a notification trigger.

Other types of industrial assets, such as telemetry devices, motor drives, etc., may have a different set of associated notifiable conditions that will be monitored by the monitoring component 312. For example, in the case of a motor drive (e.g., a variable frequency drive or other type of drive), the monitoring component 312 may monitor for internal drive abnormal conditions, including but not limited to overcurrent or undercurrent faults, overspeed or underspeed faults, overvoltage or undervoltage faults, etc.

In response to detection of an issue for which a workflow is available, the monitoring component 312 sends an instruction to the workflow generation component 318 that initiates selection and delivery of a suitable set of workflow data to one or more users determined to be capable or authorized to address the detected issue. The instruction sent by the monitoring component 312 may include a subset of indexed data 1314 that identifies the detected event and/or relevant industrial system to the workflow generation component 318. Based on this information, the workflow generation component 318 selects a set of workflow data 1110 associated with the identified event and/or automation system, and delivers the workflow data to one or more selected client devices to be presented as a workflow.

In some embodiments, notification component 314 can identify one or more suitable recipients for the workflow, based on the type of the event and/or the affected machine or device. In this regard, the system 302 can be configured to identify suitable recipients based on stored notification rules 512 (see FIG. 5). Notification rules 512 can comprise, for example, identities of plant personnel and their respective roles (e.g., operator, maintenance, shift supervisor, billing personnel, plant engineer, inventory manager, etc.), rules regarding which types of users or user roles should receive notifications for different categories of events, restrictions on the types of data that can be presented to each user based on the user's role, location-based restrictions on data presentation, how workflow data should be presented for each type of user, etc. In some embodiments, the notification component 314 may narrow the list of suitable recipients further based on current user context information, including but not limited to each potential recipient's current availability or location relative to the source of the detected issue, skills, training on a particular device or piece of equipment to which the notification relates, etc. For example, system 302 may determine each potential recipient's current location by tracking each user's respective client device or wearable computer, and deliver notifications and workflows only to those users within a defined radius of the affected machine or device.

In some embodiments, identification of the suitable recipients can be learned by the system 302 as part of the workflow learning routine. For example, if the system 302 observes over multiple instances of a particular machine downtime condition that certain specific employees typically congregate to address the issue, the workflow generation component 318 may link these identified employees with the learned workflow associated with this downtime event, and modify the notification rules 512 to reflect this association. In some embodiments, if various personnel are observed to address different occurrences of the downtime condition, the workflow generation component 318 may further determine which of the personnel typically recover the machine in the least amount of time relative to other technicians. In accordance with this determination, the workflow generation component 318 may prioritize delivery of subsequent downtime notifications and corresponding workflows to this user.

When all eligible recipients have been identified, workflow generation component 318 can send the selected workflow data 1302 to each recipient's client device. In some embodiments, system 302 may delay delivery of the workflow data 1302 until the recipient is determined to be in the vicinity of the affected machine or device. In such embodiments, the notification component 314 may initially send a notification to the recipient's client device in response to detection of the issue, without sending the workflow data to the user's device. The system 302 will then continue monitoring the recipient's location in order to determine when the recipient's current location indicates that the user is within the vicinity of the affected machine or device, based on a comparison of the user's current location and a known location of the machine or device (as indexed in data model 202). In response to determining that the user is near the machine or device, workflow generation component 318 will deliver the relevant workflow data to the user's client device in order to guide the recipient through the process of addressing the detected issues.

In some embodiments, workflow generation component 318 can format the selected workflow data leverage the rendering capabilities of the target client device. For example, if the client device is identified as being a wearable computer, workflow generation component 318 can render the workflow as an augmented reality presentation that renders a sequence of instructions as an overlay on the user's field of view. These presentations can include graphical indicator overlays that point to or otherwise visually identify devices, workstations, or machine components that the user's focus should be focused on during a current step of the workflow. Alternatively, if the client device is identified as being a simpler display device, such as a mobile phone, the workflow generation component 318 can format the workflow as a sequence of instructions rendered on the client's display screen. Such workflows may include both alphanumeric instructions, as well as graphical guides that illustrate certain steps of the workflow. These graphical guides may include, for example, diagrams illustrating the action to be performed, as well as photographic or video data that demonstrates how a given step is to be performed.

Figure 14:
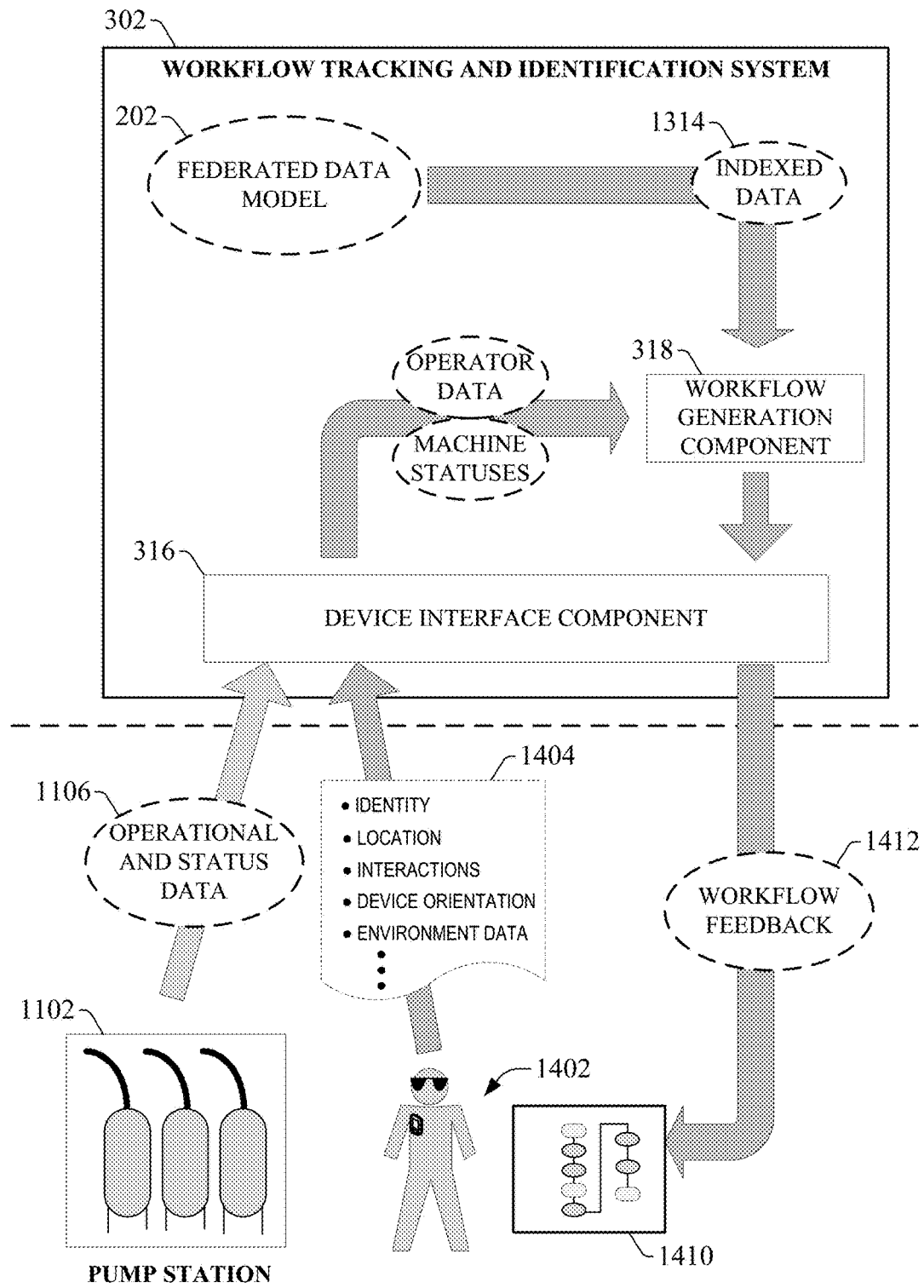
FIG. 14 is a diagram illustrating real-time workflow feedback being delivered to a user as the user is correcting a downtime issue associated with an automation system.

Execution of the workflow data 1302 on the client device causes the device to render the workflow for reference by the user, thereby informing the user of the proper sequence of operations to be performed in order to best address the detected condition. In some embodiments, while the detected condition is being addressed by one or more recipients of the workflow, the system 302 can continuously compare actual operator actions with the optimal workflow represented by the workflow data, and provide feedback to the user if the user's actions deviate from the optimal workflow. FIG. 14 is a diagram illustrating real-time workflow feedback being delivered to a user 1402 as the user is correcting a downtime issue associated with automation system 1102. During diagnosis and correction of the downtime issue, the device interface component 316 continues monitoring operational and status data for the automation system 1102 as the user 1402 carries out steps to correct the issue and recover the system.

Concurrently, the device interface component 316 collects user data 1404 that can be used to confirm that the user is performing the steps recommended by the workflow 1410 delivered to the user's client device (which is a wearable computer in the illustrated example). User data 1404 can include, for example, the user's identity and location relative to the automation system 1102 or components thereof. The user's location can be used to confirm that the user is at the appropriate location relative to the automation system 1102 to perform the workflow step currently awaiting completion (e.g., in front of the appropriate control panel, HMI, or machine station). User data 1404 can also include data indicating the user's interactions with devices associated with automation system 1102. Some of these interactions may be inferred based a correlation of the user's location relative to the system 1102 and status information collected from one or more devices of the automation system. For example, based on the user's determined proximity to a control panel and a transitioning of a mode switch on the control panel from a first position to a second position, the system 302 can confirm that the user has placed the automation system 1102 in the correct mode in accordance with a current pending step of the workflow. Other user data 1404 may include device orientation data identifying a current orientation of the user's wearable computer, which, when combined with the user's current location data, can indicate whether the user is currently viewing a correct area of the automation system 1102 for completion of a pending workflow step. In some embodiments, the device interface component 316 may also receive environment data collected by the user's client device in the form of multimedia (e.g., audio and/or video data); infrared data; heat signature data; vibration data (which may be obtained by the wearable computer via the user's body when the user touches a vibrating component of an industrial machine or system); ambient noise levels; flux data; data indicative of the presence of particular gases, particulates, smoke, or toxins within the user's immediate environment; or other such environmental data. Such environmental data may provide further information that can be leveraged by system 302 to determine if the workflow is being followed, or if an action performed by the user in connection with addressing the issue has produced an unexpected result of which the user should be notified (e.g., overheating of a part, release of a toxin, elevated levels of smoke or particulates, etc.).

Based on a comparison of the user's interactions with the system 1102 with the steps of the preferred workflow 1410, the workflow generation component 318 can generate and deliver workflow feedback data 1412 to the user's client device in response to determining that the user has deviated from the workflow. Such feedback may comprise, for example, corrective instructions intended to inform the user of the deviation and to guide the user to the correct sequence of operations dictated by the workflow. In some embodiments, based on the user's compliance with or deviation from the workflow, tracking and identification system 302 can also record performance metrics for the user that rate the user's performance of the workflow. These metrics can be used by management staff to determine which operators require additional training in connection with addressing specific performance or maintenance issues.

Although the foregoing example describes delivery of workflows, as well as workflow feedback, in connection with a machine downtime or alarm event, it is to be appreciated that similar techniques can be used to deliver workflows to machine operators for carrying out specific machine control operations during normal runtime of the machine, and to rate the operator's compliance with the workflow. For example, if the workflow tracking and identification system 302 has learned a preferred operator workflow for achieving optimal product throughput for a given production line, this workflow can be delivered to a client device associated with an on-shift operator in response to determining that a performance metric of the production line has deviated outside an acceptable tolerance, thereby providing an operating methodology to the user for bringing the performance metric back into acceptable tolerances.

Some embodiments of workflow tracking and identification system 302 may also allow individual users to customize workflows and to save the customized workflows back to the system 302 in association with their user identity. For example, the user interface generated on the client's device to render a workflow may include controls that allow the user to hide one or more steps of the workflow that the user finds unnecessary or unhelpful, thereby resulting in a personalized workflow for the given condition. The user can then save this personalized workflow back to system 302, such that, when another instance of the maintenance or operational issue occurs, the system 302 will provide the user with the modified, personalized version of the workflow rather than the default version. This can afford users a degree of control of the amount of workflow information that is provided via their personalized versions of the workflows. A user may choose to hide certain steps of a workflow as a function of the user's degree of experience or comfort level in addressing the identified issue.

Figure 15:
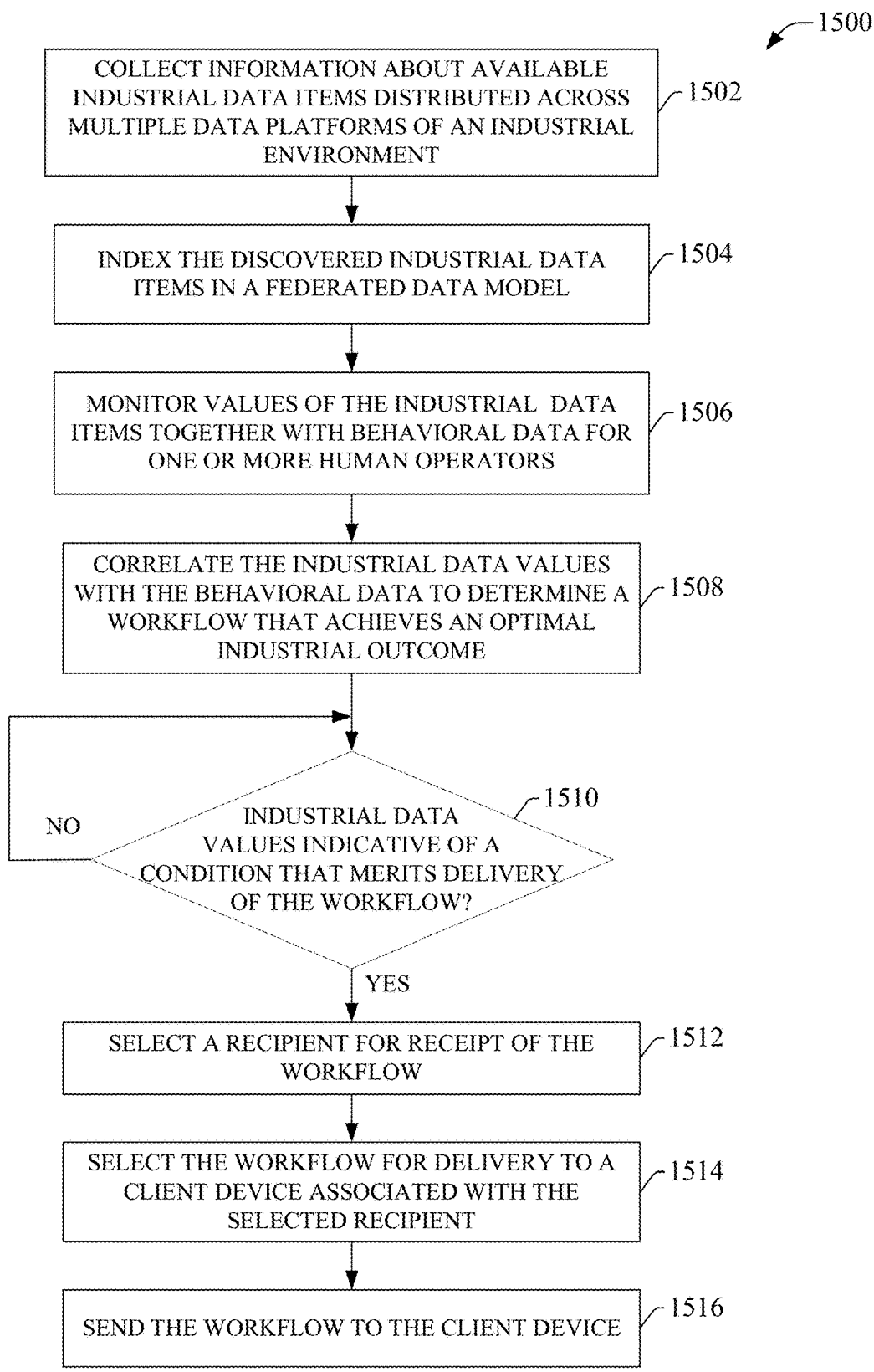
FIG. 15 is a flowchart of an example methodology for learning and delivering industrial workflows.

FIG. 15 illustrates an example methodology in accordance with one or more embodiments of the subject application. While, for purposes of simplicity of explanation, the methodology shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 15 is an example methodology 1500 for learning and delivering industrial workflows. Initially, at 1502, information about available industrial data items distributed across multiple data platforms of an industrial environment is collected. This information can be collected, for example, by an indexing component of an industrial search system implemented on a stand-alone server, a web server, a cloud platform, or other implementation. In some embodiments, the information can be collected using a crawler that navigates a plant network and collects information regarding devices and systems in use (e.g., industrial controllers, HMIs, motor drives, documentation repositories, inventory tracking systems, etc.), and the available data associated with each device or system. The indexing component can also identify correlations between data items across the various devices and data platforms (e.g., identifying that a data tag referenced on a particular rung of a control logic program is also referenced on a display screen of an HMI). At 1504, the industrial data items (and the relationships between the data items) discovered at step 1502 are indexed in a federated data model.

At 1506, values of the indexed industrial data items are monitored together with behavioral data for one or more human operators. This behavioral data can include, but is not limited to, the operators' locations within the plant environment; the operators' interactions with control panels, HMIs, or machines; biometric data; environmental data relating to the user's immediate environment; or other such user-specific information.

At 1508, the industrial data values are correlated with the behavioral data monitored at step 1506 in order to determine a workflow that achieves an optimal industrial outcome. For example, the system that implements methodology 1500 may learn over time—based on the data collection, monitoring, and correlation performed by steps 1502-1508—that a particular sequence of operator actions yields a best performance metric for a machine or production line, or a fastest recovery from a machine alarm condition. Accordingly, the system can generate a record of this workflow in a format that can be rendered on a client device and referenced by a user as a guide for achieving optimal outcomes.

At 1510, a determination is made as to whether the industrial data values are indicative of a condition that merits delivery of the workflow. This detected condition may be, for example, a machine downtime condition or other type of alarm condition, a deviation of a machine performance metric from a defined tolerance, or other such conditions. If the industrial data does not indicate such a condition (NO at step 1510), the methodology continues monitoring the industrial data values. Alternatively, if the data values indicate occurrence of such a condition (YES at step 1510), the methodology proceeds to step 1512, where a suitable recipient is selected for receipt of the workflow. The recipient may be selected based on such criteria as a type of event detected at step 1510, a location of the recipient relative to a source of the event detected at step 1510, or other such criteria. At 1514, the workflow is selected for delivery to a client device associated with the recipient selected at step 1512. At 1516, the workflow is sent to the client device for rendering.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, instrumentation, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, near field communication (NFC), Bluetooth, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 16:
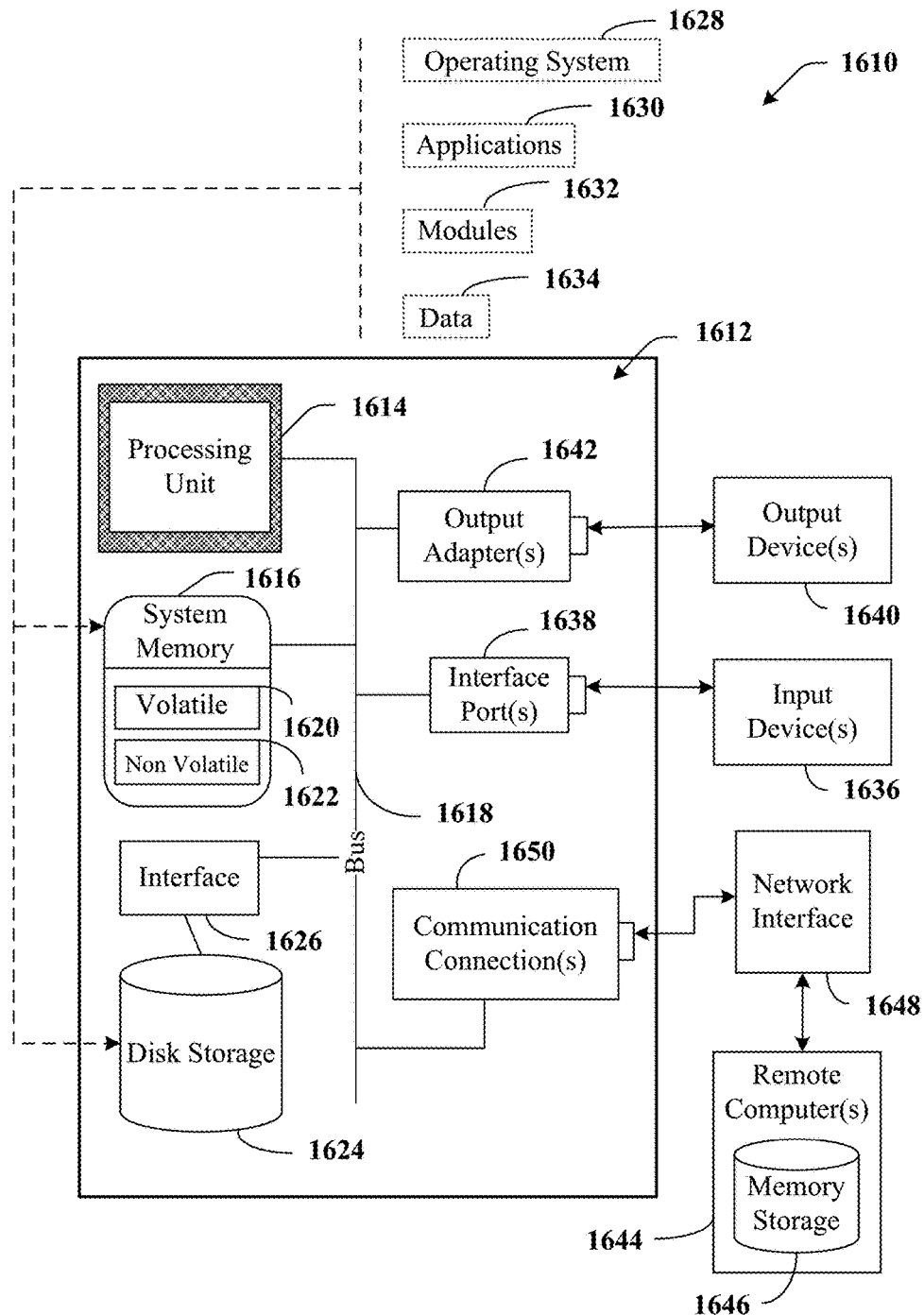
FIG. 16 is an example computing environment.
Figure 17:
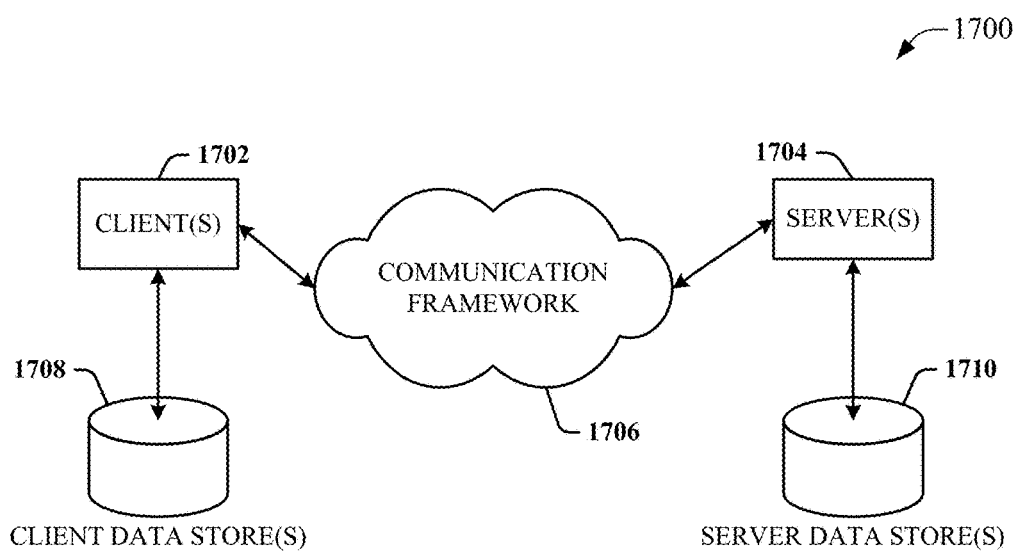
FIG. 17 is an example networking environment.

In order to provide a context for the various aspects of the disclosed subject matter, FIGS. 16 and 17 as well as the following discussion are intended to provide a brief, general description of a suitable environment in which the various aspects of the disclosed subject matter may be implemented.

With reference to FIG. 16, an example environment 1610 for implementing various aspects of the aforementioned subject matter includes a computer 1612. The computer 1612 includes a processing unit 1614, a system memory 1616, and a system bus 1618. The system bus 1618 couples system components including, but not limited to, the system memory 1616 to the processing unit 1614. The processing unit 1614 can be any of various available processors. Multi-core microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable PROM (EEPROM), or flash memory. Volatile memory 1620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/non-removable, volatile/nonvolatile computer storage media. FIG. 16 illustrates, for example a disk storage 1624. Disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1624 to the system bus 1618, a removable or non-removable interface is typically used such as interface 1626.

It is to be appreciated that FIG. 16 describes software that acts as an intermediary between users and the basic computer resources described in suitable operating environment 1610. Such software includes an operating system 1628. Operating system 1628, which can be stored on disk storage 1624, acts to control and allocate resources of the computer 1612. System applications 1630 take advantage of the management of resources by operating system 1628 through program modules 1632 and program data 1934 stored either in system memory 1616 or on disk storage 1624. It is to be appreciated that one or more embodiments of the subject disclosure can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612, and to output information from computer 1612 to an output device 1640. Output adapters 1642 are provided to illustrate that there are some output devices 1640 like monitors, speakers, and printers, among other output devices 1640, which require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL). Network interface 1648 can also encompass near field communication (NFC) or Bluetooth communication.

Communication connection(s) 1650 refers to the hardware/software employed to connect the network interface 1648 to the system bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems and DSL modems, ISDN adapters, and Ethernet cards.

FIG. 17 is a schematic block diagram of a sample computing environment 1700 with which the disclosed subject matter can interact. The sample computing environment 1700 includes one or more client(s) 1702. The client(s) 1702 can be hardware and/or software (e.g., threads, processes, computing devices). The sample computing environment 1700 also includes one or more server(s) 1704. The server(s) 1704 can also be hardware and/or software (e.g., threads, processes, computing devices). The servers 1704 can house threads to perform transformations by employing one or more embodiments as described herein, for example. One possible communication between a client 1702 and servers 1704 can be in the form of a data packet adapted to be transmitted between two or more computer processes. The sample computing environment 1700 includes a communication framework 1706 that can be employed to facilitate communications between the client(s) 1902 and the server(s) 1704. The client(s) 1702 are operably connected to one or more client data store(s) 1708 that can be employed to store information local to the client(s) 1702. Similarly, the server(s) 1704 are operably connected to one or more server data store(s) 1710 that can be employed to store information local to the servers 1704.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for learning industrial workflows, comprising:
   a memory that stores executable components;
   a processor, operatively coupled to the memory, that executes the executable components, the executable components comprising:
      a discovery component configured to collect industrial data items from multiple data sources of an industrial facility, and to collect behavioral data from one or more client devices within the industrial facility, the behavioral data representing behaviors of one or more users associated with the one or more client devices;
      a workflow generation component configured to generate and store workflow data based on a correlation of the industrial data items with the behavioral data, wherein the workflow data defines a sequence of user actions for performing a task relating to an industrial system; and
      a notification component configured to send the workflow data to client devices associated with selected user identities in response to a determination by a monitoring component that a performance metric of the industrial system has deviated from a defined tolerance range, wherein the workflow data is rendered on the respective client devices as a workflow conveying the sequence of user actions, and the workflow comprises controls configured to permit selected steps of the workflow to be hidden,
   wherein
      the workflow generation component is further configured to,
         in response to receipt, from a client device associated with a user identity of the selected user identities, of an indication of selected steps of the workflow to be hidden, generate personalized workflow data comprising the workflow data with the selected steps omitted, and
         save the personalized workflow data in association with the user identity, and
      the notification component is further configured to, in response to a subsequent determination by the monitoring component that the performance metric of the industrial system has deviated from the defined tolerance range, send the personalized workflow data to the client device associated with the user identity.

2. The system of claim 1, the executable components further comprising an indexing component configured to record the industrial data items and behavioral data in a federated data model.

3. The system of claim 1, wherein the behavioral data comprises at least one of user location data, user identity data, data indicative of an interaction between a user and the industrial system, biometric data, or multimedia data collected by the one or more client devices.

4. The system of claim 1, wherein the workflow generation component is further configured to, based on analysis of the behavioral data and at least a subset of the industrial data items, identify a sequence of interactions with the industrial system that causes the performance metric of the industrial system to satisfy a defined criterion, and to record the sequence of interactions in the workflow data as the sequence of user actions.

5. The system of claim 4, wherein the workflow generation component is further configured to tag the workflow data with an identifier of the industrial system.

6. The system of claim 1, further comprising a notification component configured to select the user identities based on at least one of an identity of the industrial system, a role associated with at least one of the user identities, or a current location determined for at least one of the user identities.

7. The system of claim 1, wherein the workflow data comprises instructions that, in response to execution on the client devices, cause the client devices to render at least one of alphanumeric instructions or graphical instructions for performing the sequence of user actions.

8. The system of claim 1, wherein the workflow generation component is further configured to identify a type of a client device of the client devices, and to customize the workflow data for rendering of the workflow in accordance with a capability of the type of the client device.

9. The system of claim 8, wherein the workflow generation component is further configured to, in response to determining that the type of the client device is a wearable computer, customize the workflow data to render the workflow as an augmented reality presentation.

10. The system of claim 1, wherein the system is configured to execute on a cloud platform.

11. The system of claim 1, wherein
   the discovery component is further configured to identify a message log stored in a database comprising an instant message discussion or an email discussion between two or more users in connection with performing the task relating to the industrial system, and
   the workflow generation component is further configured to include the message log as part of the workflow data.

12. The system of claim 1, wherein the device interface component is further configured to, during display of a step of the workflow corresponding to a prescribed user action, monitor and analyze user data collected from at least one of the client device or the industrial system to confirm that the prescribed user action is being performed, wherein the user data comprises at least one of a location of the client device or orientation data identifying a current orientation of the client device.

13. A method for creating and delivering industrial workflows, comprising:
   collecting, by a system comprising at least one processor, industrial data from an automation system of a plant facility;
   collecting, by the system, behavioral data from one or more client devices within the plant facility, the behavioral data representing behaviors of one or more users associated with the one or more client devices;
   correlating, by the system, the behavioral data with at least a subset of the industrial data;
   generating, by the system, workflow data based on the correlating, wherein the workflow data defines a sequence of user actions for performing a task relating to the automation system;
   in response to determining that a performance metric of the automation system has deviated from a tolerance range, rendering, by the system, the workflow data on client devices associated with selected users, wherein the rendering comprises:

rendering the workflow data as a workflow indicating the sequence of user actions, and rendering controls that permit selected steps of the workflow to be hidden;

in response to receiving, from a client device associated with a user of the selected users, an indication of one or more selected steps of the workflow to be hidden, generating, by the system, personalized workflow data comprising the workflow data with the one or more selected steps omitted, and saving, by the system, the personalized workflow data in association with the user; and in response to a subsequent determining that the performance metric of the automation system has deviated from the tolerance range, rendering, by the system, the personalized workflow data on the client device associated with the user.

14. The method of claim 13, wherein the collecting comprises indexing the industrial data and behavioral data in a federated data model.

15. The method of claim 13, wherein the collecting the behavioral data comprises collecting at least one of user location data, user identity data, data indicative of an interaction between a user and the automation system, biometric data, or multimedia data collected by the one or more client devices.

16. The method of claim 13, wherein the generating the workflow data comprises:

based on the correlating, identifying a sequence of user interactions with the automation system that causes the performance metric of the automation system to satisfy a defined criterion; and recording the sequence of interactions as the workflow data.

17. The method of claim 16, further comprising storing, by the system, the workflow data and the personalized workflow data in association with an identifier of the automation system.

18. The method of claim 17, further comprising selecting the selected users based on at least one of an identity of the automation system, a role associated with the user, or a determined current location associated with the user.

19. A non-transitory computer-readable medium having stored thereon instructions that, in response to execution, cause a system comprising a processor to perform operations, the operations comprising:

collecting industrial data items generated by industrial devices of an industrial system;

collecting behavioral data from one or more client devices within an industrial facility associated with the industrial system, the behavioral data representing behaviors of one or more users associated with the one or more client devices;

analyzing the behavioral data and at least a subset of the industrial data items;

generating workflow data based on a result of the analyzing, wherein the workflow data defines a sequence of user actions for performing a task relating to the industrial system;

in response to determining that a performance indicator of the industrial system does not satisfy a performance criterion, rendering the workflow data on client devices associated with selected users, wherein the rendering comprises:

displaying the workflow data as a workflow indicating the sequence of user actions, and displaying controls that allow selected steps of the workflow to be hidden;

in response to receiving, from a client device associated with a user of the selected users, an indication of one or more selected steps of the workflow to be hidden, generating personalized workflow data based on the workflow data with the one or more selected steps omitted, and saving the personalized workflow data in association with the user; and in response to a subsequent determining that the performance metric of the industrial system does not satisfy the performance criterion, rendering the personalized workflow data on the client devices associated with the user.

20. The non-transitory computer-readable medium of claim 19, wherein the collecting the behavioral data comprises collecting at least one of user location data, user identity data, data indicative of an interaction between a user and the industrial system, biometric data, or multimedia data collected by the one or more client devices.

* * * * *